United States Patent
Patton et al.

(10) Patent No.: US 9,647,607 B2
(45) Date of Patent: May 9, 2017

(54) ROOF MOUNTED INSTALLATION SYSTEM

(71) Applicant: Sustainable Technologies, LLC, Auburn, CA (US)

(72) Inventors: John C. Patton, Granite Bay, CA (US); YangLin Li, ShenZhen (CN); ZhengXue Zhang, Morong Town (CN); Eric L. Hafter, Sacramento, CA (US)

(73) Assignee: Sustainable Technologies, LLC, Auburn, CA (US)

( * ) Notice: Subject to any disclaimer, the term of this patent is extended or adjusted under 35 U.S.C. 154(b) by 0 days.

(21) Appl. No.: 14/813,950

(22) Filed: Jul. 30, 2015

(65) Prior Publication Data
US 2015/0326171 A1   Nov. 12, 2015

Related U.S. Application Data

(63) Continuation of application No. 13/561,905, filed on Jul. 30, 2012, now Pat. No. 9,109,814, which is a
(Continued)

(51) Int. Cl.
*H02S 20/24* (2014.01)
*H02S 20/00* (2014.01)
(Continued)

(52) U.S. Cl.
CPC ............ *H02S 20/24* (2014.12); *F24J 2/4607* (2013.01); *F24J 2/5233* (2013.01); *F24J 2/5239* (2013.01);
(Continued)

(58) Field of Classification Search
CPC ........ F24J 2/4607; F24J 2/5254; F24J 2/5233; F24J 2/5239; F24J 2/5245; F24J 2/5264;
(Continued)

(56) References Cited

U.S. PATENT DOCUMENTS 4,111,188 A   9/1978  Murphy, Jr.
4,112,693 A * 9/1978  Collin ................ E21D 21/0086
                                                        405/132
(Continued)

FOREIGN PATENT DOCUMENTS

DE   29703481 U1   11/1997
JP   200064523    2/2000
(Continued)

OTHER PUBLICATIONS www.thompsontec.com; Flush Mount Rail System, Technical Specifications, 2008; 2 pages.
(Continued)

*Primary Examiner* — Rodney Mintz
(74) *Attorney, Agent, or Firm* — Santangelo Law Offices, P.C.

(57) ABSTRACT

A solar power system is mounted to a solar power componentry support structure suspended above a pre-existing surface by a collective of solar collector suspension base supports. Suspended solar power system row support structure members and suspended solar power system column support structure members may for a solar component position lattice to which a matrix of individual solar power components such as solar panels can be attached. Solar module quick-fasten assemblages may serve also as solar componentry emergency releases and may include loose axis retainers and firm axis fasteners such as dual component, single point operative emergency releases and fasteners. Slide-in retainers and corner slot tabs can be included as well as frame alignment notches. Fulcrum pivot fasteners and slide wedge releases can aid in installation and release. Pre-sealed roof base supports such as semidome base supports can include a sandwiched membrane.

27 Claims, 22 Drawing Sheets

Related U.S. Application Data continuation of application No. 12/680,732, filed as application No. PCT/US2009/043368 on May 8, 2009, now abandoned.

(60) Provisional application No. 61/126,947, filed on May 8, 2008, provisional application No. 61/130,359, filed on May 29, 2008, provisional application No. 61/205,556, filed on Jan. 21, 2009.

(51) Int. Cl.
- *F24J 2/46* (2006.01)
- *F24J 2/52* (2006.01)
- *H02S 20/23* (2014.01)

(52) U.S. Cl.
CPC ........... *F24J 2/5245* (2013.01); *F24J 2/5254* (2013.01); *F24J 2/5264* (2013.01); *H02S 20/00* (2013.01); *F24J 2/4638* (2013.01); *F24J 2002/4661* (2013.01); *F24J 2002/5292* (2013.01); *F24J 2002/5294* (2013.01); *Y02B 10/12* (2013.01); *Y02B 10/20* (2013.01); *Y02E 10/47* (2013.01); *Y02E 10/50* (2013.01); *Y10T 29/49002* (2015.01); *Y10T 29/49826* (2015.01)

(58) Field of Classification Search
CPC ......... F24J 2002/4661; F24J 2002/5292; F24J 2002/5294; F24J 2/4638; H02S 20/00; H02S 20/24; Y10T 29/49826; Y10T 29/49002; Y02E 10/50; Y02E 10/47; Y02B 10/20; Y02B 10/12
USPC ..... 52/173.1, 173.3; 126/621, 623; 136/244; 248/237; 403/3, 107, 108, 292, 293, 294, 403/306
See application file for complete search history.

(56) References Cited

U.S. PATENT DOCUMENTS

| | | | |
|---|---|---|---|
| 4,429,872 A | 2/1984 | Capachi | |
| 4,744,187 A * | 5/1988 | Tripp | E04D 5/143 411/179 |
| 4,763,456 A * | 8/1988 | Giannuzzi | E04D 3/3603 411/133 |
| 4,945,699 A * | 8/1990 | Murphy | E04D 5/145 52/410 |
| 4,966,631 A | 10/1990 | Matlin et al. | |
| 5,102,275 A * | 4/1992 | Hulsey | E04D 3/3603 411/134 |
| 5,143,556 A | 9/1992 | Matlin | |
| 5,164,020 A | 11/1992 | Wagner et al. | |
| 5,228,644 A * | 7/1993 | Garriott | B64G 1/443 136/245 |
| 5,289,356 A | 2/1994 | Winston | |
| 5,344,496 A | 9/1994 | Stern et al. | |
| 5,497,587 A | 3/1996 | Hirai et al. | |
| 5,505,788 A | 4/1996 | Dinwoodie | |
| 5,537,991 A | 7/1996 | Winston et al. | |
| 5,571,338 A | 11/1996 | Kadonome et al. | |
| 5,706,617 A | 1/1998 | Hirai et al. | |
| 5,746,029 A | 5/1998 | Ullman | |
| 5,746,839 A | 5/1998 | Dinwoodie | |
| 5,930,969 A * | 8/1999 | Mayle | E04D 5/142 52/410 |
| 6,058,930 A | 5/2000 | Shingleton | |
| 6,093,884 A | 7/2000 | Toyomura et al. | |
| 6,111,189 A | 8/2000 | Garvison et al. | |
| 6,201,180 B1 | 3/2001 | Meyer et al. | |
| 6,207,889 B1 | 3/2001 | Toyomura et al. | |
| 6,233,889 B1 * | 5/2001 | Hulsey | E04D 3/3603 411/533 |
| 6,250,034 B1 * | 6/2001 | Hulsey | E04D 3/3603 411/545 |
| 6,269,596 B1 | 8/2001 | Ohtsuka et al. | |
| 6,282,857 B1 * | 9/2001 | Rubenacker | F16B 43/02 411/531 |
| 6,360,491 B1 | 3/2002 | Ullman | |
| 6,465,724 B1 | 10/2002 | Garvison et al. | |
| 6,467,916 B2 | 10/2002 | Winston | |
| 6,501,013 B1 | 12/2002 | Dinwoodie | |
| 6,526,701 B2 * | 3/2003 | Stearns | E04D 13/10 248/237 |
| 6,534,703 B2 | 3/2003 | Dinwoodie | |
| 6,670,541 B2 | 12/2003 | Negao et al. | |
| 6,672,018 B2 | 1/2004 | Shingleton | |
| 6,784,360 B2 | 8/2004 | Nakajima et al. | |
| 6,809,251 B2 | 10/2004 | Dinwoodie | |
| D510,315 S * | 10/2005 | Shugar | D13/102 |
| 6,958,868 B1 | 10/2005 | Pender | |
| 6,959,517 B2 | 11/2005 | Poddany et al. | |
| 6,987,604 B2 | 1/2006 | Rabinowitz et al. | |
| RE38,988 E | 2/2006 | Dinwoodie | |
| D519,444 S | 4/2006 | Mascolo | |
| 7,043,884 B2 | 5/2006 | Moreno | |
| 7,156,088 B2 | 1/2007 | Luconi | |
| D565,505 S * | 4/2008 | Shugar | D13/102 |
| 7,386,922 B1 * | 6/2008 | Taylor | E04D 13/10 24/525 |
| 7,388,146 B2 | 6/2008 | Fraas et al. | |
| 7,406,800 B2 | 8/2008 | Cinnamon et al. | |
| 7,413,392 B2 * | 8/2008 | Nebesnak | E04D 5/142 411/531 |
| 7,475,513 B2 * | 1/2009 | Parker | F16L 3/1091 248/49 |
| 7,631,468 B2 * | 12/2009 | Gong | E04D 5/145 411/162 |
| 7,935,202 B2 | 5/2011 | Stanley | |
| 8,122,648 B1 * | 2/2012 | Liu | F24J 2/5245 126/623 |
| 8,166,720 B2 * | 5/2012 | Garrigus | E04D 5/142 52/408 |
| 8,250,829 B2 * | 8/2012 | McPheeters | E04D 13/1476 136/244 |
| 8,316,617 B2 * | 11/2012 | Krovats | E04D 11/005 52/24 |
| 8,623,158 B2 * | 1/2014 | Stanley | E04D 13/1407 156/291 |
| 8,683,751 B2 * | 4/2014 | Stearns | E04D 13/10 52/173.1 |
| 8,733,718 B2 * | 5/2014 | Corsi | E04B 1/40 248/205.1 |
| 8,782,983 B2 * | 7/2014 | Stearns | E04D 13/10 248/237 |
| 8,826,618 B2 * | 9/2014 | Stearns | E04D 13/10 248/237 |
| 9,109,814 B2 * | 8/2015 | Patton | F24J 2/4607 136/251 |
| 9,479,110 B2 | 10/2016 | Patton et al. | |
| 2002/0066235 A1 | 6/2002 | Stearns | |
| 2003/0015637 A1 | 1/2003 | Liebendorfer | |
| 2003/0033780 A1 * | 2/2003 | Hasan | E04D 5/14 52/410 |
| 2003/0070368 A1 | 4/2003 | Shingleton | |
| 2004/0007260 A1 | 1/2004 | Dinwoodie | |
| 2004/0148888 A1 * | 8/2004 | Kuhn | E04D 5/145 52/410 |
| 2004/0163338 A1 | 8/2004 | Liebendorfer | |
| 2004/0261955 A1 | 12/2004 | Shingleton et al. | |
| 2005/0144870 A1 | 7/2005 | Dinwoodie | |
| 2006/0054212 A1 | 3/2006 | Fraas et al. | |
| 2006/0185289 A1 * | 8/2006 | Gong | E04D 5/145 52/410 |
| 2007/0102036 A1 | 5/2007 | Cinnamon | |
| 2007/0144575 A1 | 6/2007 | Mascolo et al. | |
| 2007/0151594 A1 | 7/2007 | Mascolo et al. | |
| 2007/0272234 A1 | 11/2007 | Allen et al. | |
| 2007/0295392 A1 | 12/2007 | Cinnamon | |
| 2007/0295393 A1 | 12/2007 | Cinnamon | |

(56) References Cited

U.S. PATENT DOCUMENTS

| | | | | |
|---|---|---|---|---|
| 2008/0121273 A1* | 5/2008 | Plaisted | ............... | F16L 3/127 |
| | | | | 136/251 |
| 2009/0050194 A1 | 2/2009 | Noble et al. | | |
| 2009/0078299 A1 | 3/2009 | Cinnamon et al. | | |
| 2009/0199846 A1* | 8/2009 | Collins | ............... | F24J 2/405 |
| | | | | 126/601 |
| 2010/0192505 A1* | 8/2010 | Schaefer | ............ | A47B 96/14 |
| | | | | 52/653.2 |
| 2010/0243023 A1 | 9/2010 | Patton et al. | | |
| 2011/0203637 A1* | 8/2011 | Patton | ............... | F24J 2/5205 |
| | | | | 136/244 |
| 2011/0240207 A1* | 10/2011 | Stanley | ........... | E04D 13/1407 |
| | | | | 156/91 |
| 2012/0312355 A1* | 12/2012 | Patton | ............... | F24J 2/4607 |
| | | | | 136/251 |
| 2013/0320161 A1* | 12/2013 | Merhar | .............. | F16M 11/00 |
| | | | | 248/121 |
| 2015/0034355 A1* | 2/2015 | Patton | ............... | F24J 2/5245 |
| | | | | 174/78 |
| 2015/0069198 A1* | 3/2015 | West | .................. | E04B 1/38 |
| | | | | 248/237 |
| 2016/0020722 A1* | 1/2016 | Patton | ............... | F24J 2/4607 |
| | | | | 136/251 |

FOREIGN PATENT DOCUMENTS

| | | | |
|---|---|---|---|
| WO | 2007038760 | A2 | 4/2007 |
| WO | 2009137809 | A1 | 11/2009 |

OTHER PUBLICATIONS www.quickmountpv.com; Installation Instructions; 1 page, 2009.
www.thompsontec.com; Flat Jack, Technical Specifications; 2008; 2 pages.
U.S. Appl. No. 61/126,947, filed May 8, 2008.
U.S. Appl. No. 61/130,359, filed May 29, 2008.
U.S. Appl. No. 61/205,556, filed Jan. 21, 2009.
International Patent Application No. PCT/US2009/043368, International Search Report dated Jul. 9, 2009.
International Patent Application No. PCT/US2009/043368, Written Opinion dated Jul. 9, 2009.
International Patent Application No. PCT/US2009/043368, International Preliminary Report on Patentability dated Apr. 5, 2012.
Parallel Chinese Patent Application No. 200980126953.X, Office Action dated Nov. 13, 2012.
U.S. Appl. No. 12/680,732, filed Mar. 29, 2010.
JP2000064523A, Filed Aug. 19, 1998, Published Feb. 29, 2000. Abstract only.
OMG Roofing Products; PowerGrip Roof Mount System pamphlet; Based on technology from U.S. Pat. No. 8,683,751; copyright 2015; 2 pages.
U.S. Appl. No. 13/561,905, filed Jul. 30, 2012.
www.quickmountpv.com/products.php; Quick Mount PV Products, Manufacterer of Waterproof Mounts for the PC Industry; 1 page. (c) 2009; retrieved Oct. 2, 2009.
www.ttisolar.com/prodcuts/flatjack_order.html; Flat Jack Roof Mount Order Form; 2 pages. (c) 2008 Thompson Technology Industries, Inc., retrieved Oct. 2, 2009.
Solar Power System Installation Manual; SRS Mountain System, Rectangular Modules; Sharp Electronics Corp., 44 pages, Jun. 5, 2007.
www.we-llc.com/WEEB_hotitowrks.html; Bonding a PV module to an anodized aluminum frame using the WEEB; 1 page. (c) Wiley Electronics 2005, retrieved Oct. 2, 2009.
U.S. Appl. No. 14/866,680, filed Sep. 25, 2015. First Named Inventor: John C. Patton. Office Action dated May 24, 2016. 18 pages.
U.S. Appl. No. 14/866,680, filed Sep. 25, 2015. First Named Inventor: John C. Patton. Notice of Allowance dated Sep. 8, 2016. 25 pages.

* cited by examiner

ROOF MOUNTED INSTALLATION SYSTEM

This application is continuation of application Ser. No. 13/561,905 filed Jul. 30, 2012, which is a continuation of application Ser. No. 12/680,732 filed Mar. 29, 2010, now abandoned, which is the U.S. National Stage of International Application No. PCT/US2009/043368, filed May 8, 2009, which claims priority to and the benefit of U.S. Provisional Application No. 61/205,556, filed Jan. 21, 2009, U.S. Provisional Application No. 61/130,359, filed May 29, 2008, and U.S. Provisional Application No. 61/126,947, filed May 8, 2008, each application hereby incorporated herein by reference.

TECHNICAL FIELD

This invention relates to the field of solar panel support systems such as for flat or low pitch roofs that are very easy to install, low cost, and incorporate a number of safety systems. Solar collector PV module arrays are formed by a plurality of solar panels on a support system which can be either laid on a roof with no penetration, with ballast and no penetrations or penetrations, or any combination of the three types.

BACKGROUND

The field of solar power has become very important. Solar power systems can be installed in huge seas as well as for individual residential and commercial usage. These individual systems can supply power to an underlying structure, and can also supply excess power into the grid or the like. For individual systems, it is not uncommon to locate these systems on the roofs of buildings. These roofs can be angled roofs or flat roofs. In many commercial applications a flat roof is frequently encountered and the solar panel system is placed on the roof itself.

In order to remain economic, it is not only important that individual solar panels or the like produce a significant amount of power, but it can also be important that both the materials and structures by reasonably priced, and that the actual installation be achieved without too much difficulty. In addition, when solar power systems are placed on the roof, it can become important, such as the event of fire or the like, that this solar power system does not unduly interfere with firefighting operations or the like. Thus, in presenting solar power systems for roof mount or other surface mount installations, it can be important to present both and efficiently installed and purchased systems as well as a system that can accommodate the needs of emergency personnel.

Several aspects can be important in this regard. First, with respect to the emergency aspect, it can be important to permit emergency personnel to be able to immediately release and dispatch at least portions of the solar power system to be able to provide access to larger areas of the roof or the like. This can need to occur under adverse conditions such as smoke, fire, rain, wind, or at nighttime.

Removing solar panels or the like can be particularly challenging when the solar power systems are designed to produce electrical power. By the very nature of many photovoltaic systems, if they are used in daylight, there is power. This can be challenging for emergency personnel as it is undesirable for them during firefighting or other operations to be exposed to live electrical wires.

The perspective of initial installation of the solar power system is also important in the overall economics of this field. For instance, while solar power systems are bought from manufacturers who frequently make individual complements, a separate installer is frequently employed to actually site, locate, and connect collective of power componentry that makes a roof mount or other solar power system. Installers, of course, have differing degrees of capabilities. In addition, the initial cost of the system should not be increased significantly for simply the action of installing it on a pre-existing roof or other surface. Furthermore, the cost of the solar panels and other such componentry itself is significant enough that the cost of an underlying structure, should not be so large as to greatly increase the cost of the overall system. As may be imagined, there is constant pressure to make underlying structures and indeed the entire solar power system, less expensive. Thus, small amounts of savings can add up and are desired. Beyond the cost of the system, the actual labor of installation is also in focus. The more time an installer needs to spend on a roof or other area installing individual componentry, the more expensive the overall system is to a user. Thus, it is desirable to reduce the cost of not only the componentry involved, but also to reduce the cost of the installation labor. This can occur, most significantly, by reducing the amount of the labor needed to achieve the installation. Thus, it is desirable to present solar power systems that take less time to install, that cost less to purchase, and that provide for the needs of emergency situations and emergency personnel.

DISCLOSURE OF INVENTION

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The present invention presents designs that can be implemented in various embodiments. These embodiments can meet a variety of needs ranging from lower-cost, solar power systems to easier to install solar power systems, to emergency accommodative, solar power systems. In general, the invention involves the inclusion of emergency releases and quick fasteners to aid in both the installation of a system as well as a potential release under emergency conditions of at least some components of the system. Specific designs can involve supports that suspend a solar power componentry support structure to which solar power components can be attached. The solar components can be items such as solar panels or the like. In various embodiments, designs can present a solar component position lattice that can include quick fasteners, as well as emergency releases at particularly beneficial locations. The quick fasteners may include retainers, and single point operative fasteners to aid in installation. These single point operative fasteners can also be configured as emergency releases so that a fireman with an ordinary toolset can immediately understand and release large area components of the overall solar power system.

Specific designs can include special components that aid in maintaining the integrity of that pre-existing roof seal and can include integral elements to enhance and be congruent with a sealed roof such as a flat roof. Channel members can be used in an efficient manner to connect to the base supports as well as to establish an elevated structure for the individual solar components. Designs can provide support structure that can be a pliant support such as at an immediate stage to permit adjustments and accommodation of practically encountered roof irregularities.

Naturally these and other aspects and goals are discussed in the following specification and claims.

MODE(S) FOR CARRYING OUT THE INVENTION

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
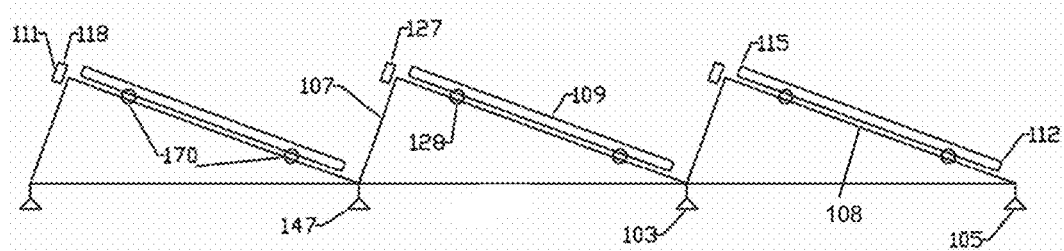
FIG. 1 is a schematic diagram of a generic embodiment the invention.

As can be seen from FIG. 1, the invention consists of generic elements that may be embodied in many different forms. From this more general figure, it can be seen that embodiments of the invention may include a collective of solar collector suspension base supports (103) that may sit on or be attached to a pre-existing surface (101) such as a roof or the like. For many roof applications, these base supports may be suspension roof base supports (147) as shown in FIG. 1. The solar collector suspension base supports (103) can act to suspend a solar power componentry support structure (104) above the roof so that only the minimal contact necessary exists. This can help preserve the integrity of or seal of the roof or other pre-existing surface (101).

On the solar power componentry support structure (104) may exist some type of solar collector mount system that can allow components or an integral solar collector system to be supported by the solar power componentry support structure (104) so that it can achieve its purpose, namely, the collection of solar energy for the particular beneficial purpose desired, including but not limited to, the generation of power, electrically, thermally, or otherwise. One type of solar collector system is, of course, a photovoltaic system to generate electrical power. This type of a system is what is representatively depicted in the various figures, without limitation.

Figure 2:
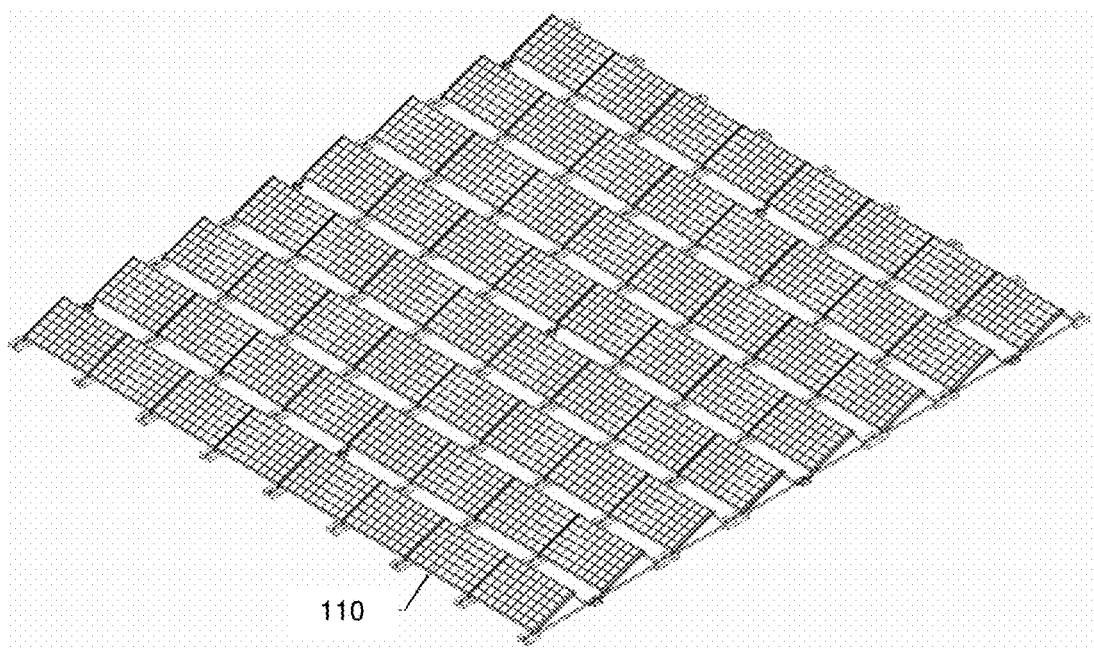
FIG. 2 is a perspective view of an embodiment the invention on a flat roof.

An aspect of the invention is that it can be efficient to install and efficient to place. As can be understood from FIGS. 2 and 3, the solar power componentry support structure (104) can be a solar component position lattice (107), such as a collection of members that frame support locations is some manner. An example of one solar component position lattice (107) is a layout such as shown to establish a collective or matrix of solar components such as a matrix of solar panels (18). To establish a solar component position lattice (107), embodiments may include two types of members referred to as row and column members without limitation, as a strict orthogonal row and column arrangement is not required. As shown, such members may be suspended solar power system row support structure members (105) and suspended solar power system column support structure members (106). For instance, FIG. 2 depicts an 8 row by 8 column system. As may be appreciated, each such member may be suspended by action of the solar collector suspension base supports (103) to minimize impact to a roof or other pre-existing surface (101). While the terminology designating items as a row and column is merely for reference and not limiting, it can be seen that in the embodiments shown, the suspended solar power system row support structure members (105) can be envisioned as arranged along a direction parallel to the bottom of the solar panels (18). Similarly, the suspended solar power system column support structure members (106) can be envisioned as arranged along a direction perpendicular to the bottom of the solar panels (18), or along their sides.

The solar power componentry support structure (104) can be used to establish a collective of solar component emplacement locations (108) at which individual solar power components (109) can be placed. These solar component emplacement locations (108) can be locations to permit establishing a matrix (110) of individual solar components. An embodiment of a base system may have solar panels (18) on panel supports that are tied together in two, perhaps horizontal, directions to create a full array that may even be completely tied together such as to distribute the wind loads over a large footprint.

At each location, embodiments may include one or more solar module quick-fasten assemblages (111) to permit the individual solar components to be placed and attached at desired locations. Embodiments may also have solar componentry emergency releases (118) to permit the individual solar components to be released such as in the event of an emergency. Such individual solar components may be solar panels (18) as discussed earlier and as shown in the embodiments of the figures. When a matrix (110) of individual components is involved, the entire system may have a collective of solar module quick-fasten assemblages (111) and/or a collective of solar componentry emergency releases (118). In addition, some embodiments may include solar component retainers (170) to aid on the process of attaching the individual solar components as discussed below.

As mentioned above, from a general perspective the invention may present embodiments that may meet differing goals. For example, embodiments may be configured to provide a modularized solar power system, that is, one that may use existing components so it may be configured for the particular location or installation through regular module components. Either in addition or alternatively, embodiments may be configured to provide an adaptive installation solar power system such as one that can adapt to peculiarities of a location, perhaps such as surface irregularities or other non-regularized layouts or surfaces. Embodiments can present an efficient method of installing a solar power system as well, among other goals. In meeting the goal of providing an efficient installation, in some embodiments, most of the support system can be pre-assembled before installation so very few parts are required to be assembled on a roof or other surface. Most all fasteners may be pre-assembled to the assemblies and mating parts may be slotted so assembly is very fast. Any penetrations or attachments to a roof or into a roof may be designed for rapid attachment and perhaps also sealing.

The solar collector suspension base supports (103) can suspend some aspects, such as the solar power componentry support structure (104), above the pre-existing surface (101), perhaps a roof. Structures may serve to position the system or particular solar components relative to the solar power componentry support structure (104) suspended by the solar collector suspension base supports (103). By connecting the solar power system support structure members such as the suspended solar power system row support structure members (105) and the suspended solar power system column support structure members (106), an installer can create the solar component position lattice (107) on a surface such as a roof. In this manner, there can be a solar power component or componentry support roof lattice. Several steps can be used to establish the lattice. In one embodiment, the lattice can be firmly enough established prior to placing the individual solar components on the lattice that it can support itself. In this manner, embodiments can provide a self supporting solar component position lattice that can remain in place under at least not extreme conditions so that a separate step of installing the various individual solar components can then be installed at a convenient time, whether it be in minutes, hours, or days later. As discussed below, the self supporting solar component position lattice can be rigid or pliant in its self supporting mode, the pliant aspect serving to allow movement adjustment for irregularities and the like, perhaps prior to final clamp down.

Figure 3:
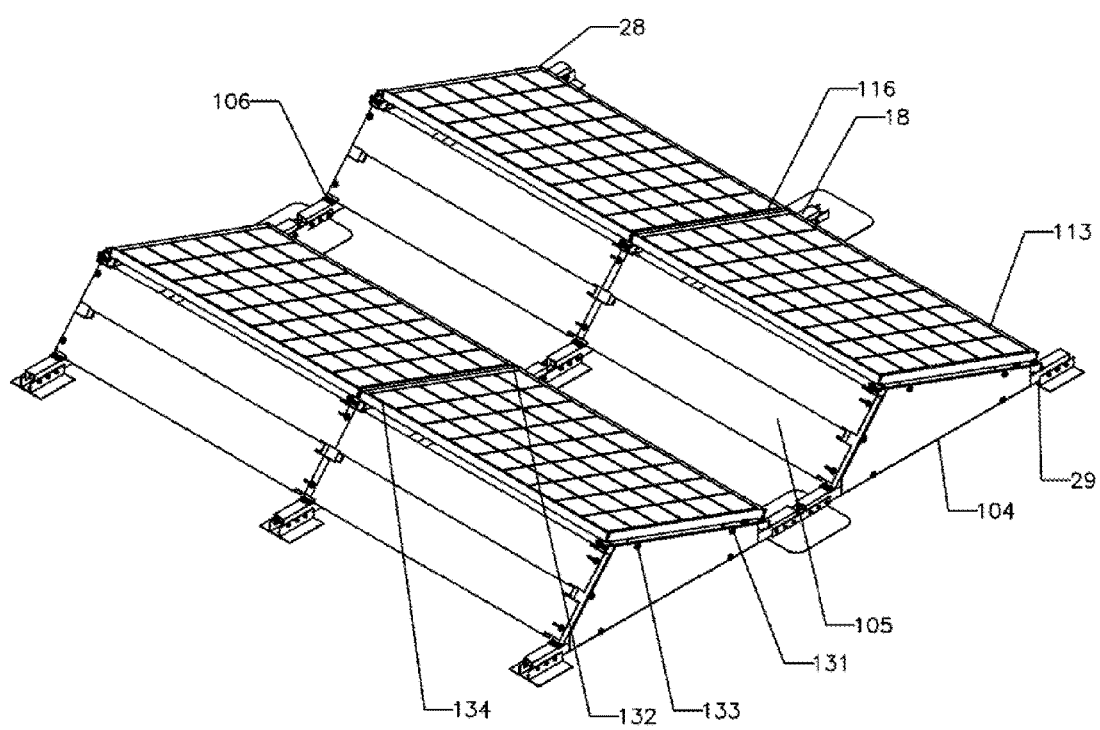
FIG. 3 is a perspective view of a 2 row by 2 column system.

As can be on understood from FIG. 3, the lattice can establish a collective of solar component individual solar emplacement locations (108) at which individual solar power components can be placed. By attaching each individual solar power component at its respective individual solar emplacement location (108), an entire matrix (110) of individual items can be established. Each individual solar power component can be fixedly emplaced at its respective individual solar emplacement location (108). In this fashion, the solar power componentry support structure (104) can fixedly support the matrix (110). Naturally, this matrix (110) can be established on a roof or other location and thus can present a matrix of individual solar power components (109) mounted on the solar power componentry support structure (104).

The actual steps of installing the solar power components on the solar power componentry support structure (104) can involve a variety of options. First, the solar power component involved can be positioned at the appropriate location. In some embodiments, it can then be retained in an at least one direction. Finally, it may be attached to the support structure by fastening it to a solar power componentry support structure (104) by some type of fastener. Naturally, the steps can be repeated for other individual solar components and thus the solar power componentry support structure can be made to support at least some adjacent solar components. Whether as part of the installing steps or otherwise, electrical connections can be made for solar items that require such a connection, for instance a photovoltaic panel or the like. As can be appreciated from the designs shown in this invention, embodiments may include assemblages of solar component retainers (170), releases, and fasteners to achieve the desired goals. These assemblages may be a collective of solar module quick-fasten assemblages (111) mounted on the solar power componentry support structure (104) such as on the suspended solar component position lattice.

Figure 4A:
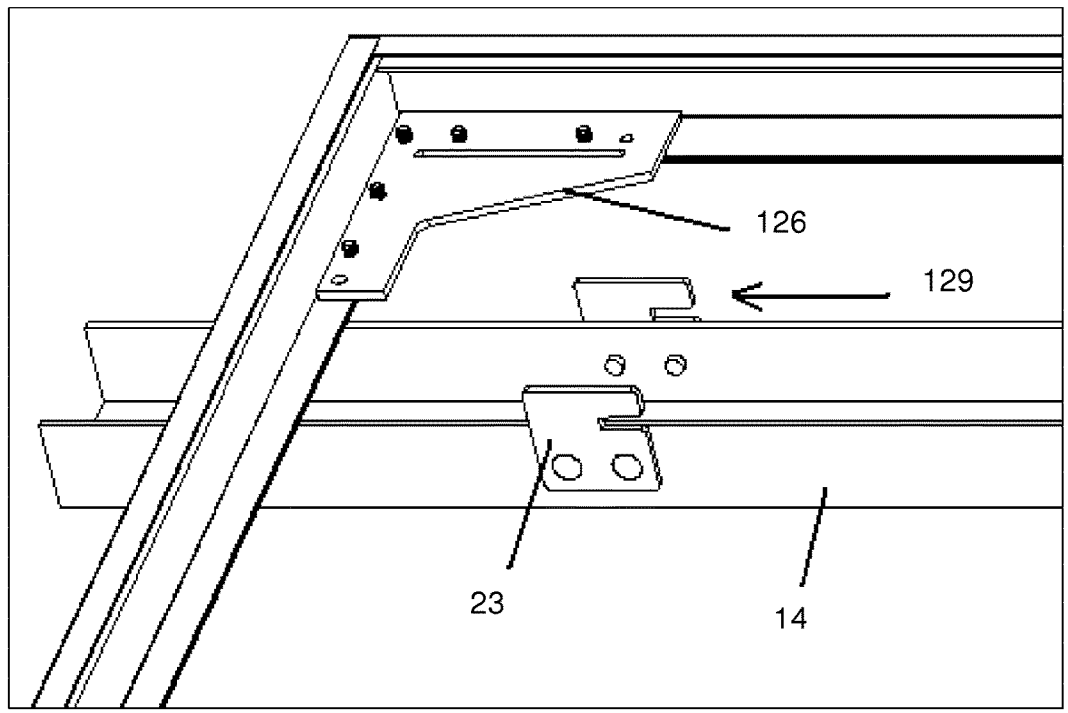
FIGS. 4A and 4B are perspective views of retainer fingers engaging a slotted tab.
Figure 4B:
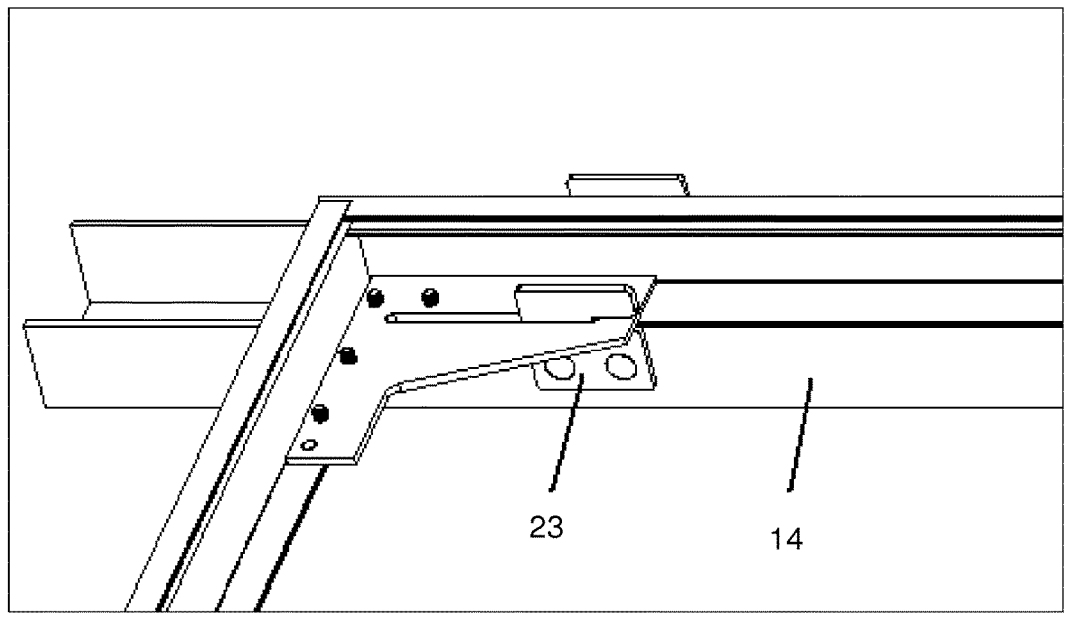
Figure 5:
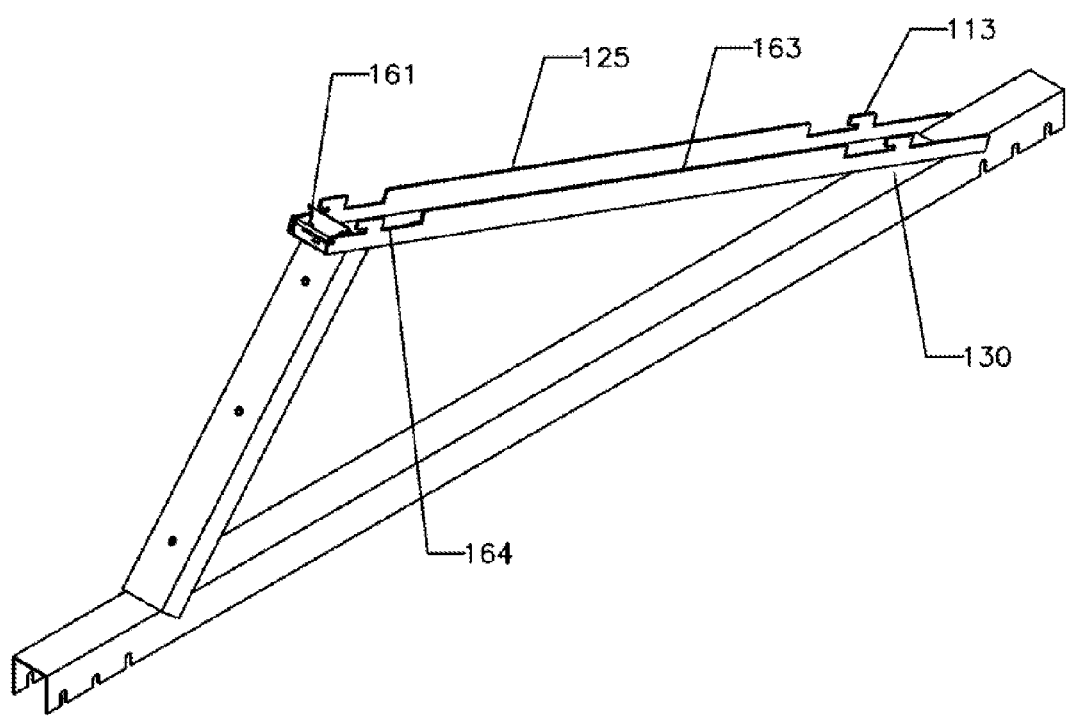
FIG. 5 is a perspective view of a column support member.
Figure 6:
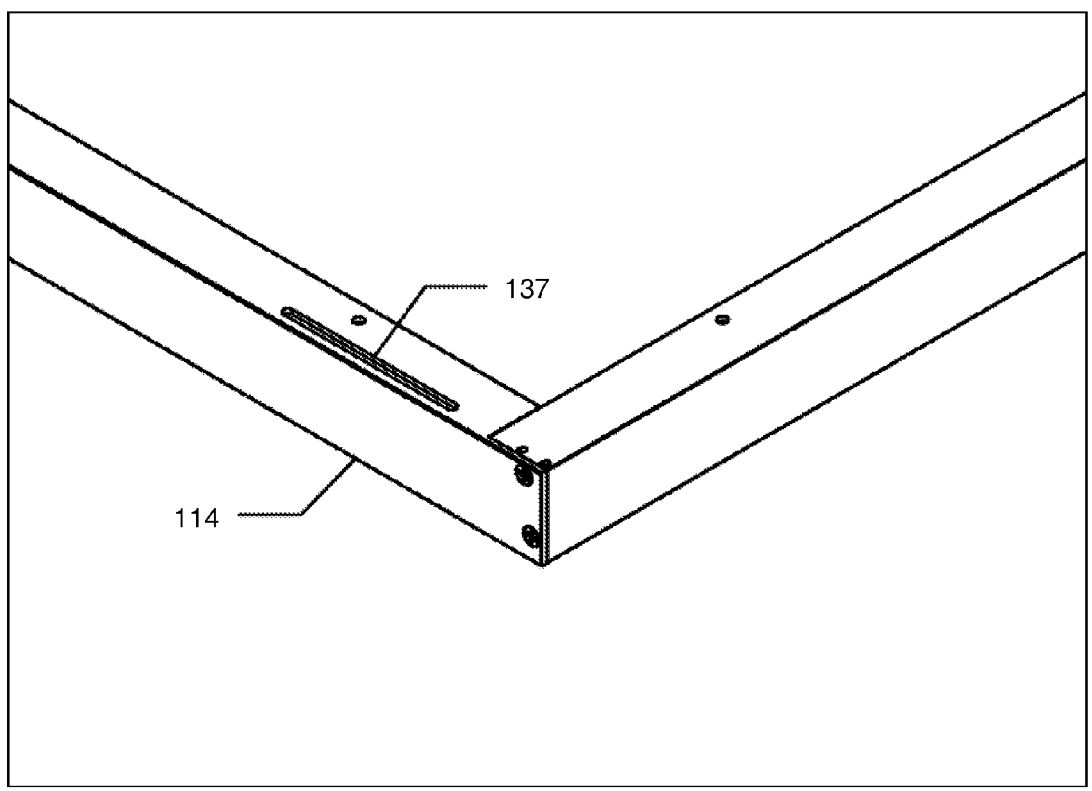
FIG. 6 is a perspective view of a slotted frame.
Figure 7A:
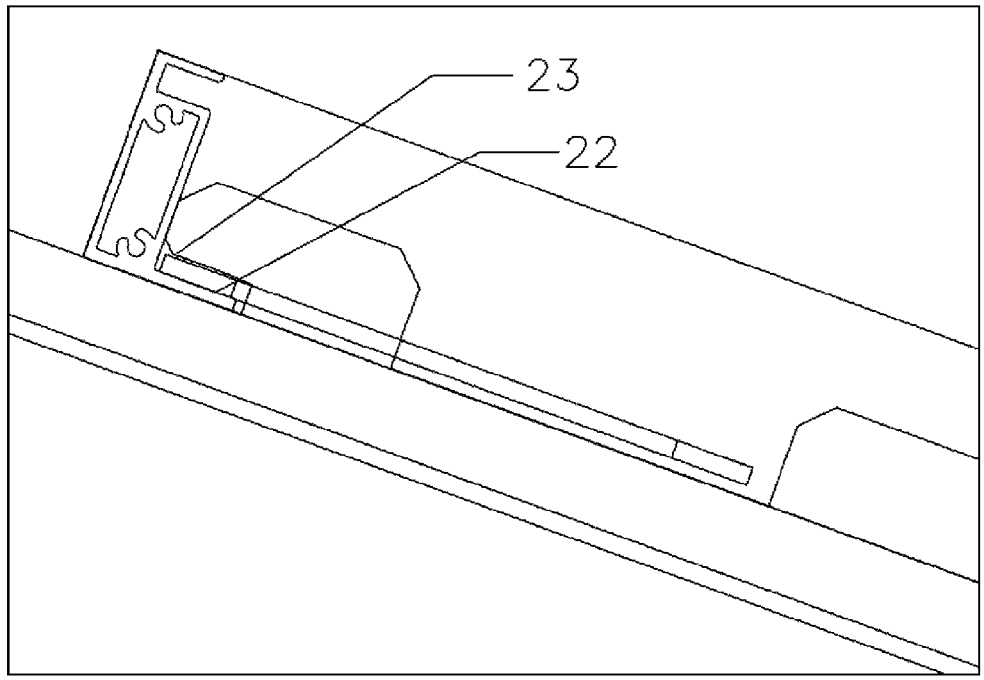
FIG. 7A is a cross section view of a panel support finger, solar panel bracket and solar module.
Figure 7B:
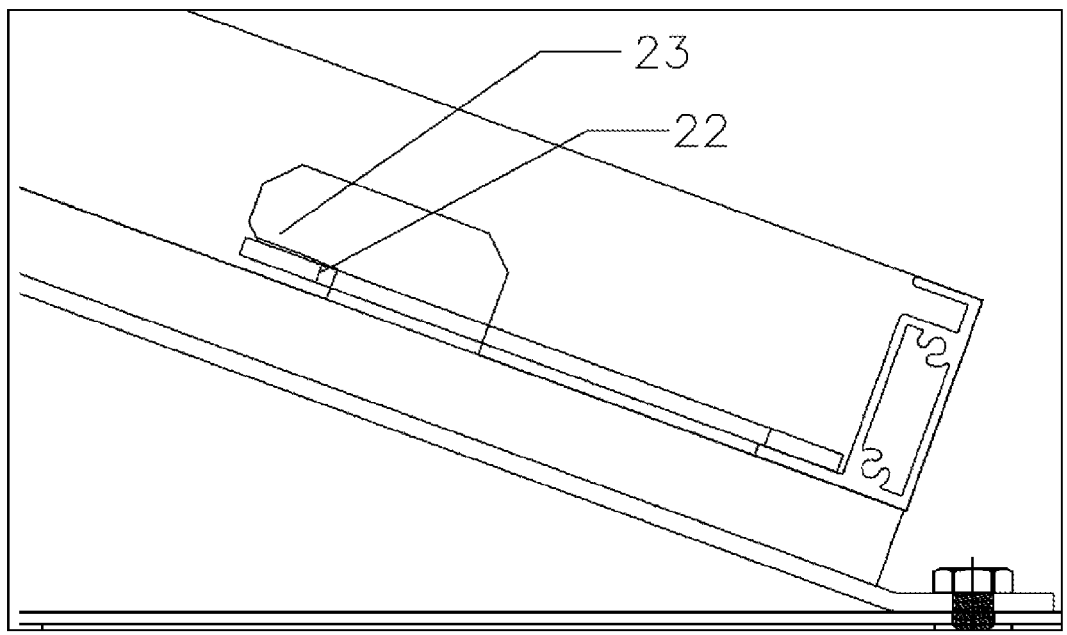
FIG. 7B is a cross section view of a panel support finger, solar panel bracket and solar module at another location.

As may be appreciated from the views shown in FIGS. 4 and 5, various embodiments are possible. In the embodiment shown, the solar component can have a first solar component emplacement edge (112) such as the bottom edge of the solar panel (18). Somewhere perhaps in the vicinity of the first solar component emplacement edge (112), there can exist a solar component retainer (170). This solar component retainer (170) can result in defining a first attachment location (113) at a first portion of a solar component (114). The solar component retainer (170) can be used to cause some degree of retention of the solar component (114) so that ultimately fastening or fixing can occur. As can be appreciated from the particular embodiment shown, there may be more than one solar component retainer (170). In the embodiment shown, the solar component retainers are depicted as slide-in retainers. As shown, there may be a first solar component slide-in retainer (131), a second solar component slide-in retainer (132), a third solar component slide-in retainer (133), and perhaps even a fourth solar component slide-in or other such retainer (134). Whether simultaneously or sequentially, different portions of the solar component can be slid onto or otherwise engage a retainer and then ultimate fastening can occur, perhaps at a different location.

For such embodiments where the solar component retainer (170) serves as a portion of the attachment, the fixation of the solar component to the solar power componentry support structure (104) can occur by use of a separate fastener or the like. As shown in the figures, this fastener be positioned at an opposite solar component emplacement edge (115) perhaps such as at the top edge. Thus, the attachment process can conceptually involve positioning the component at a first solar component emplacement edge, engaging a first portion of the solar component at a first solar attachment location (113) with a first solar component slide-in retainer (131), engaging a second portion of the solar component at a second solar attachment location (116) with a second solar component slide-in retainer (132) at a location and that is separate from the first solar attachment location (113) to somewhat securely hold or retain the solar component such as the solar panel (18) to the solar power componentry support structure (104). As may be appreciated from the figures, additional solar component retainers (170) can be used. This can, of course, include items such as the third solar component slide-in retainer (133) and the fourth solar component slide-in retainer (134). In this type of an embodiment, the solar component retainers (170) can serve as loose axis retainers (128) and then once all is in place, a firm axis fastener (127) positioned perhaps at an opposite solar component emplacement edge (115) can be used to complete the attachment process and rigidly hold or securely fix the solar panel (18) or other item to the solar power componentry support structure (104).

Figure 8:
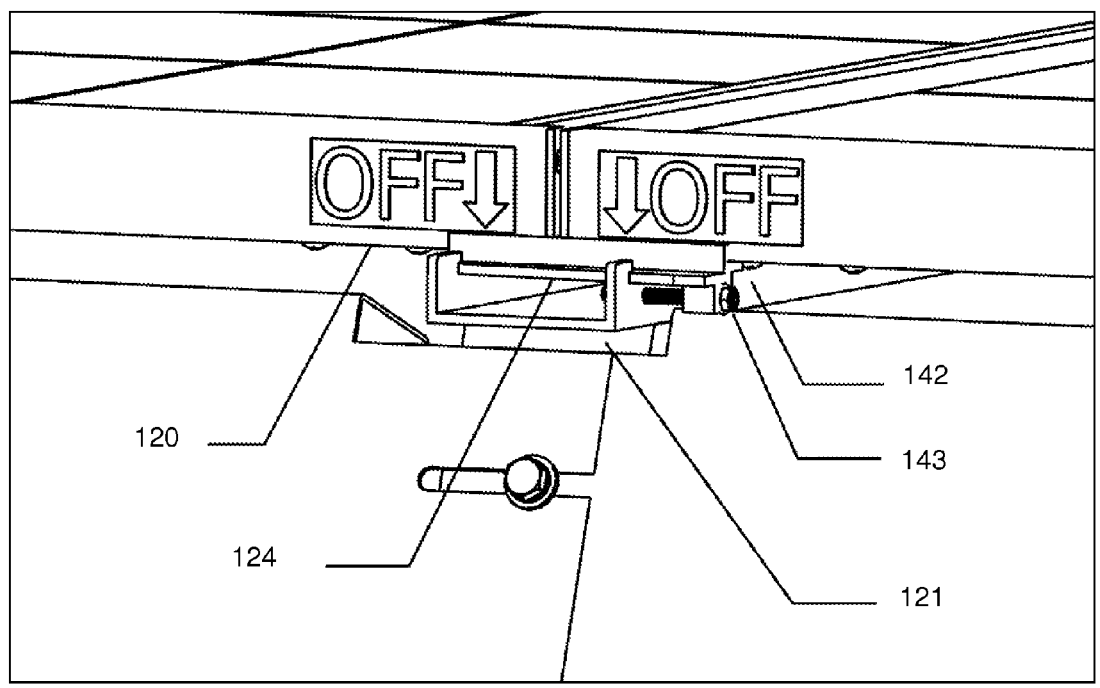
FIG. 8 is a perspective view of a wedge fastener and release.
Figure 9:
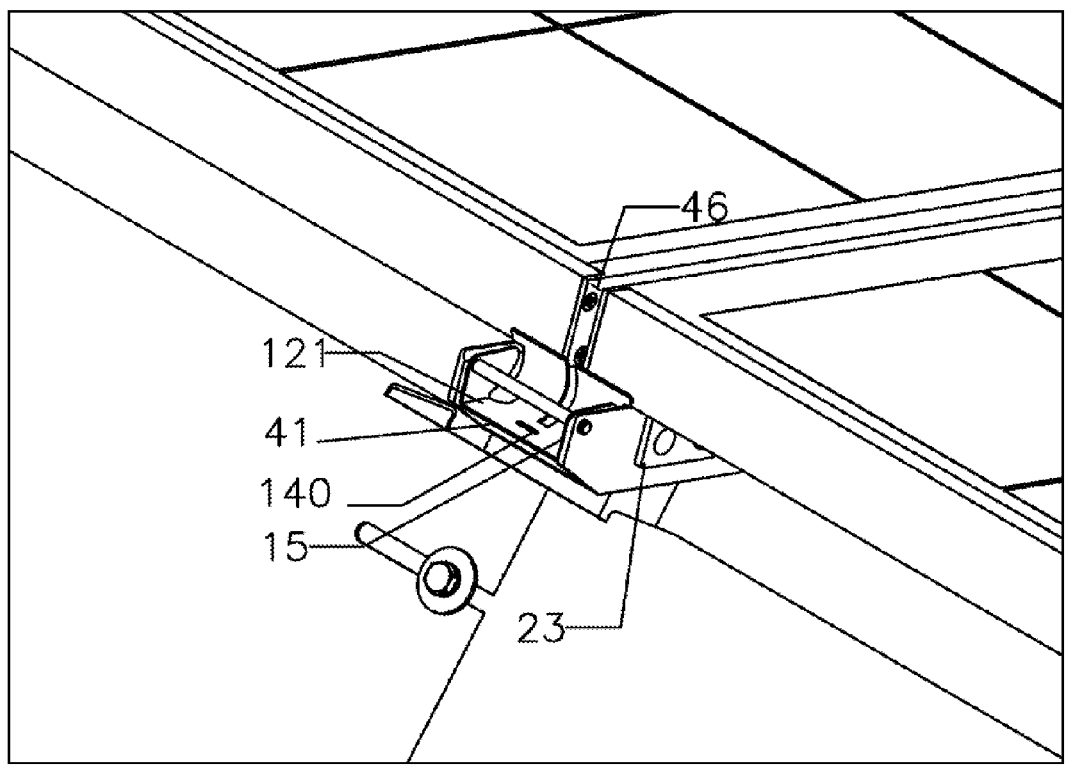
FIG. 9 is a perspective view of a pivot fastener and release.
Figure 10A:
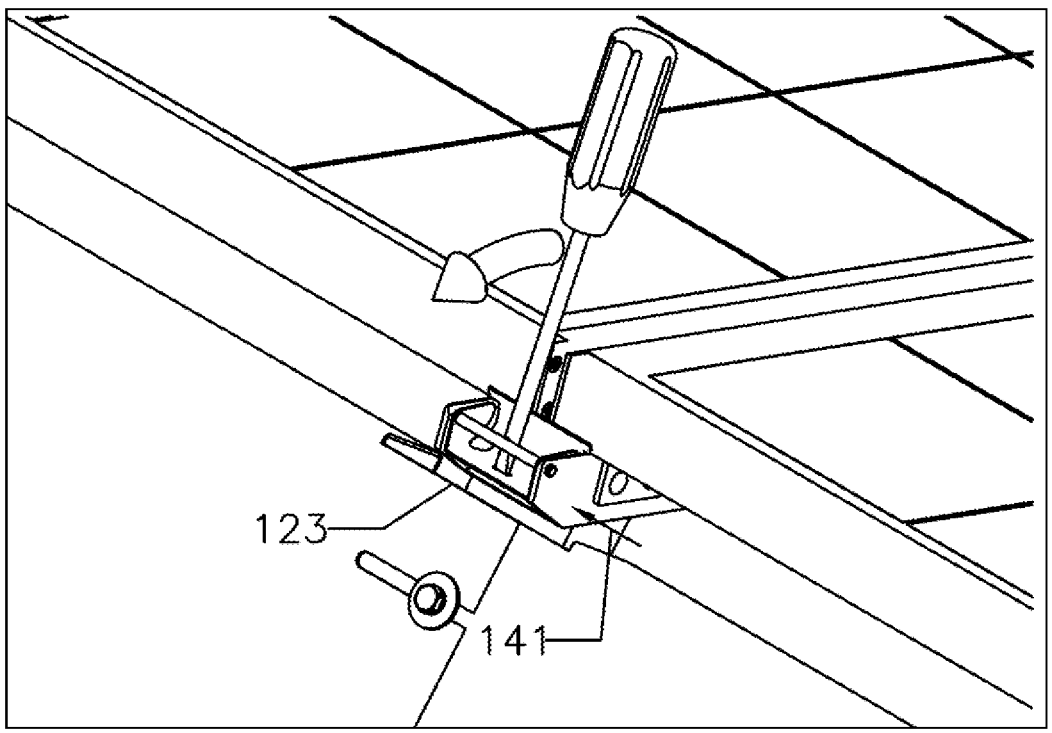
FIGS. 10A and 10B are perspective views of a fulcrum fastener and release.
Figure 10:
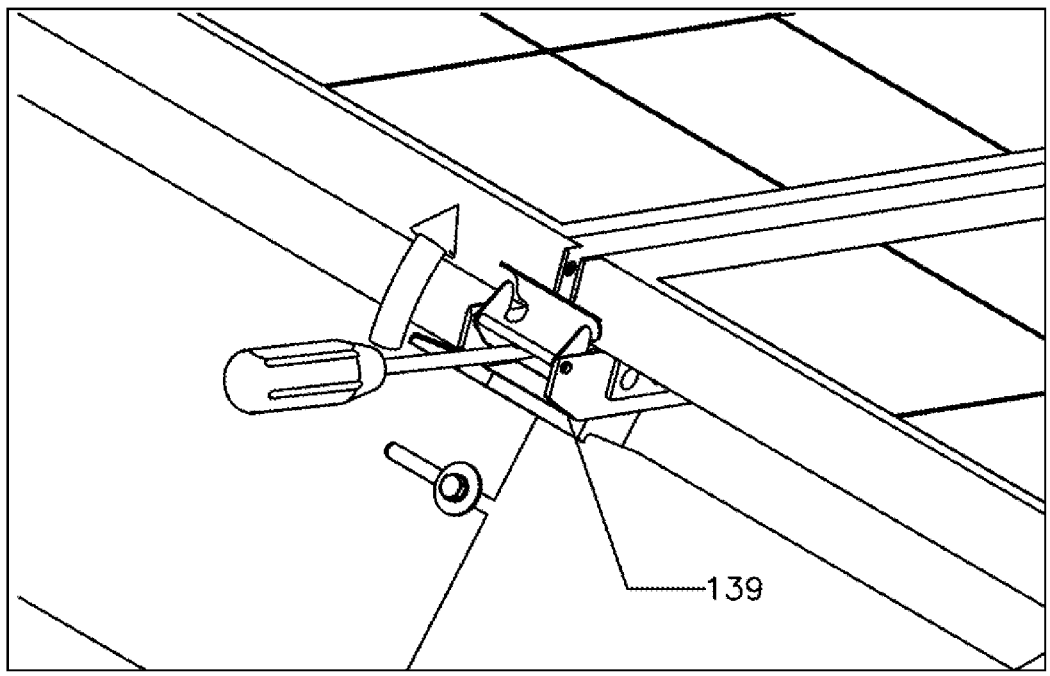
Figure 11:
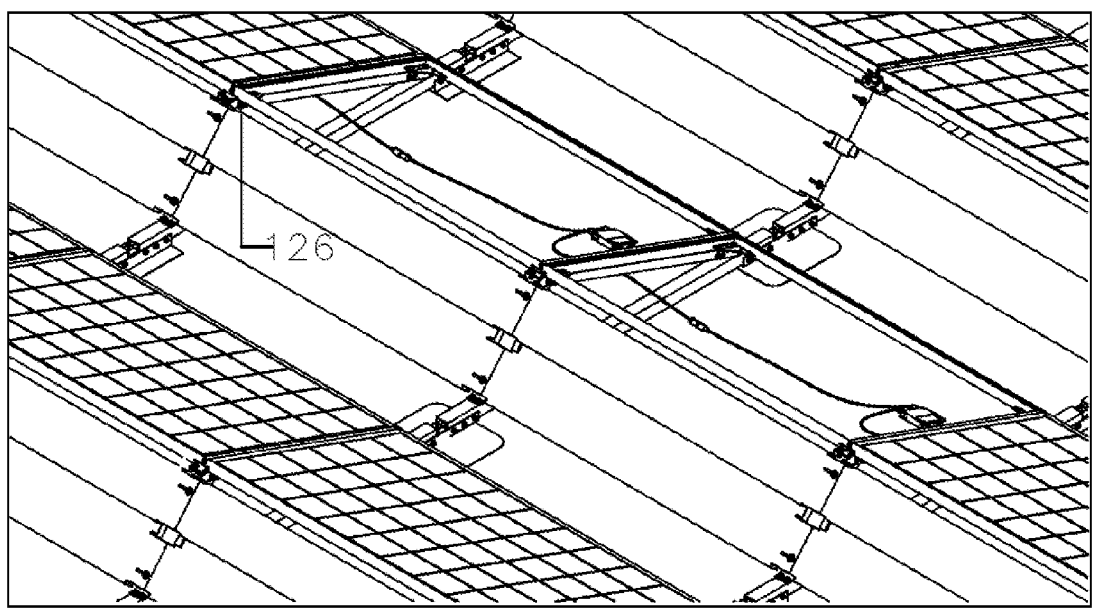
FIG. 11 is a perspective view of electrical connections for a solar panel.

Besides merely attaching or fastening the solar component to the solar power componentry support structure (104), embodiments can achieve the goal of emergency release as well. Again various embodiments are possible, however, in the figures, two of the many possible different embodiments are shown. As shown in FIGS. 8, 9, and 10, it can be seen that both the panel clamps in these figures can meet the requirements of fire fighters to be able to quickly release the solar panel in case of a fire or other need. Thus, embodiments can be configured to facilitate emergency release such as by emergency personnel. Systems having this function can be considered emergency personnel accommodative solar power systems, and can include a collective of solar componentry emergency releases (118). To meet the needs of firefighters and other emergency personnel, embodiments can allow release and removal of one, or more, or even all of a matrix of large area solar power components to maximize access. Embodiments can thus facilitate a removal of a large area solar power component.

Because fires and emergencies and the like can occur at night and under other adverse conditions, it may be important to have embodiments that provide a collective of evident retainers or fasteners so that the emergency personnel can readily locate the attachment points. Embodiments can include a collective of large and visible emergency releases perhaps even at common locations so that once one is noticed, the locations of others can be readily understood. This can also be true of the solar component retainers (170) as well as fasteners, because it may be necessary to act immediately upon them as well. In this manner, embodiments can provide a collective of evident side retainers that at least partially retain each individual solar power component (119) and can provide for the step of evidently side retaining each individual solar power component. The releases themselves may each be exposed and evident emergency releases as shown in FIGS. 1, 8, 9, and 10. There may be gross labeled emergency releases (120) with highly visible and perhaps iconic labeling as shown so that a release opportunity can be immediately understood regardless of the conditions.

One manner in which the releases may be particularly visible is by having them stand out at a logical location. By placing the releases at the top and back end of the solar panels (18), emergency personnel can almost expect to see such a release at this location. This can make a system all the more usable for such emergency personnel in the event of an immediate need. These embodiments can be considered as having a collective of back emergency releases and even a collective of common location emergency releases such as by having all the releases at the top back or other location of each individual solar component.

The location of the releases or fasteners can make it easier to access as well. By providing a collective of component top end emergency releases or component top end quick-fasten assemblages it can be easier to accomplish installation or emergency release. Naturally, elevating the releases to provide a collective of elevated emergency releases makes them both easier to find and easier to operate. The same is true for a collective of elevated solar module quick-fasten assemblages. This can coordinate well with the desire to angle the solar panel (18) to more perpendicularly capture solar irradiation. Thus, embodiments may have a collection of elevated solar component ends at which placing a fastener or release is desirable.

In instances where solar componentry emergency releases (118) are included, it can be helpful to make these releases detachably yieldable, and even destructively operable. By having some type of fastener that can yield, and by permitting a surmountable retention character so that when a reasonable amount of force is applied to the fastener it yields and will permit detaching of the particular component involved, embodiments can be considered as presenting a collective of detachably yieldable releases.

One aspect that can be beneficial for emergency personnel is to have designs, where one point permits an emergency release of a particular component. Such embodiments can be considered as presenting a collective of point yield emergency releases. By providing emergency releases that can be operated in a panic either by breaking them or surmounting and limited amount of fastening resistance, embodiments can be considered as presenting a collective of surmountable panic releases to facilitate immediate emergency release of a particular solar component. As one example, if a solar panel (18) has to be removed very quickly, a standard fireman's toolset can be used in a variety of manners. As explained below, a screwdriver can be used to pry the fastener open, an ax can be used to force a wedge off, or even a pair of cutters can be used to cut a soft metal screw (21) such as at point (20) to release the solar panel (18). Because the immediate need in an emergency situation is not to protect this particular item of property, but rather to simply remove it, designs can be provided, which present a collective of destructively operable emergency releases or even a collective of fireman cuttable emergency releases. This can involve using a relatively fragile screw to which a fastener, perhaps such as a detachably yieldable wedge release is operably responsive. The aspect of fastening the component can involve operating or screwing in a relatively fragile screw to cause the fastener to fix the solar component. Then, conversely, in a panic situation (even though the firemen are not likely panicked), an emergency personnel can cut or break the relatively fragile screw or the other element to cause release by the detachably yieldable wedge or other release. In designs where a hammer or ax may be used, the fastener or release may be operated destructively, but the paramount goal, again, will likely be removing the panels or other components.

Another aspect that can be beneficial to for some embodiments is the fact that fasteners and releases can be single acting and yet hold dual compounds or the like. As one example, a split panel clamp (15) is shown in FIG. 9. A cut (41) may be included to allow the two sides of the split panel clamp to act somewhat independently from each other against the panel (18). When the system is placed on a flat roof, diagonally across a pitch or valley the panels can twist slightly which can make the two panel edges have different locations with respect to the panel clamp. Also, when the panel clamp is on the end of a row, there may only be one panel on the panel clamp. This type of a panel clamp may allow for better force against panels in these situations, and may also allow for slight variances in dimensions of parts of the solar power system structure. Through designs such as this, embodiments may present a collective of dual component, single point operative emergency releases (121) or a collective of dual component, single point operative solar module quick-fasten assemblages. Again, both the release and fastener aspects can be achieved at a single point for easy operation. Thus, embodiments may present a collective of single point operative fasteners or releases. By employing a collective of single point operative solar module quick-fasten assemblages or releases, one location can be the site at which an easy operation can be achieved to either release a solar component or fasten a solar component.

Embodiments may also have substantially single operation fasteners or releases so that only one operation, perhaps pivoting, sliding, or snapping an item into place can be conducted to achieve the desired activity. This can be true whether embodiments have dual component or single component assemblages. For the two different goals of both emergency releasing a solar component and quickly installing a solar component, designs can permit a singular operation. For example, embodiments can include a collective of dual component, single point operative solar component placement fasteners, a single point operative fastener (122), a single point structure attachment, and can even facilitate the steps of dual component, single point fastening individual solar power components at their respective individual solar matrix locations, dual component, single point fastening two solar components, providing a collective of dual component, single point operative emergency releases, providing a single point structure attachment, and can achieve single point fastening individual solar power components at their respective individual solar matrix locations.

As mentioned above, and whether for installation fastening or emergency release, it can be important for embodiments to limit the number of motions required. This can either speed up installation or provide the immediate release necessary in an emergency situation. As shown in the figures, some designs can present releases where not more than one or two motions are necessary. For example, in the pivotable release, a screwdriver can be used to pivot the release and thus in one motion release the particular component. This embodiment can be considered as presenting a collective of not more than one motion activation emergency releases (123). Similarly, installation can be achieved by simply pivoting closed the release. This embodiment can be considered as presenting a collective of not more than one motion activation quick-fasten assemblages. Other embodiments can even be limited to just two motions. For instance, the wedge design shown can be considered as allowing release by not more than two motions, for example, first cutting a fragile screw and second pushing or hitting the wedge sideways to release the components. This type of an embodiment can be considered as presenting a collective of not more than two motion activation emergency releases (124). Similarly installation can be achieved with two motions for this same design. First, the wedge may be positioned and then the fragile screw can be the operated to drive a wedge into place. In this type of an arrangement the embodiment can be considered as presenting a collective of not more than two motion activation quick-fasten assemblages. In such a design it might also be understood that the wedge can be placed in advance and thus only one operation, namely, operating the fragile screw might be employed to achieve installation.

In emergency situations, once the particular component is released, it may be important to provide for a dispatch of that component from its location. While it is desirable to open up a large area for access, it may conversely be desirable to provide components that are small enough that they may be literally thrown or tossed by an average emergency person. Solar panels may weigh on the order of 38 pounds, and so they can be removed, and even tossed off a roof or the like in an emergency situation. The entire attachment, retaining, and fastening situation for the particular component can be important to permit the desired dispatch of the component in an emergency situation. For example, embodiments may include a single dispatch discharge (125) for each individual solar power component whereby in one single dispatch motion the panel can be removed. As shown, once the emergency release is operated whether by hitting, pivoting, or cutting, a solar panel (18) need only be grabbed and pooled in an upward direction to become completely released from the solar power componentry support structure (104). In this manner, embodiments can facilitate singly dispatching each individual solar power component after operation of the emergency release. As described, this type of an embodiment would involve conducting not substantially more than one motion to accomplish the complete dispatch of the particular solar power component involved. Similarly, two motions could be involved, such as removing the component, and then tearing it out of its location. This could be useful in designs where an electrical connection needs to be considered.

For solar power systems that involve photovoltaic power, it may be important to remove or establish electrical connections. Emergency personnel can find this to be particularly important as they do not want to be exposed to the electrical power being produced by a solar panel (18) when removing it. Embodiments can accommodate this desire by making the emergency release distant from the electrical connections for each individual component. By providing a collective of electrical exposure distanced emergency releases (126) that are perhaps even at an opposite end of a solar panel (18), safety of the emergency person can be considered. Embodiments can also have a collective of single dispatch electrical connections that can each disconnect an individual solar power component on one action. Such single dispatch electrical connections can be an individual plug or even a tearable wire at some location so that after release the component can be safely and immediately electrically disconnected and tossed off the roof or the like.

For installation, an aspect that can be important is quick fastening the particular component to a solar power componentry support structure (104). This can be accomplished by using solar module quick-fasten assemblages (111) that can allow attachment of a collective of solar modules such as a collective of solar panels (18) in a more efficient manner than simply screwing in four bolts or the like. One type of embodiment that can be used in this regard involves both solar power component retainers (170) and a quick fastener. These solar power component retainers (170) may be slide-in retainers as shown or some other type of design. In FIG. 4, a panel support finger (23) is shown. These panel support fingers (23) can be attached to the panel support (16) by any type of appropriate fastening method and may even be integral to some type of panel support (16). As may be appreciated, the solar power component retainers (170) may establish a collective of loose axis retainers (128) that while holding a solar power component in one or two directions, leave another direction loose. For example, from understanding the first solar component slide in retainer (131), it can be seen that this retainer holds the solar panel (18) "vertically" from moving away from the support and "horizontally" from sliding down the support while yet leaving it loose to move up along the support structure. Once all four of the solar component slide-in retainers, have been engaged, some type of firm axis fastener can be used to restrict the one or more remaining free movements. Thus, embodiments can be considered as presenting a collective of firm axis fasteners (127) that can be engaged at some point, such as after the loose axis retainers (128).

As may be appreciated from the designs shown, multiple points can be used to and the solar power component. This can involve one, two, three, four, or any number of retaining elements and embodiments can involve a plurality of multi-point individual solar power component retainers that at least partially retain the individual solar power component. Because the retainers can be configured as loose axis retainers (128), embodiments can be considered as only achieving substantial placement when just the retainers are engaged. Such embodiments can involve a substantial placement retainer assemblage that at least partially retains the individual solar power component. Naturally this may be accomplished prior to accomplishing the step of fastening the solar power component to the support structure. FIGS. 4 through 7 show how the panel support fingers (23) can initially retain or hold the solar panel (18) to the panel support assembly. By positioning the fingers at the side of the solar panel (18), these fingers can serve as a collective of side component retainers that at least partially retain the component to the support. As shown, the solar component retainers (170) can be flat projection slide-in retainers mounted on or integral to the underlying support structure. This underlying support structure can be members such as the solar component side column structures or the suspended solar power system column support structure members (106). In this manner, embodiments can provide solar component side column structure retainers (130). These solar component side column structure retainers (130) may be on, or integral to, channel structures as discussed later.

As the figures show, the solar panel (18) or other solar power component can slide into the fingers along a solar component initial insertion axis (129) of the solar component slide-in retainers. Once so engaged, these solar component retainers (170) can axially retain the individual solar power component from movement away from the support structure while still permitting movement along the support structure at least in one direction. In conjunction with these retainers, embodiments can provide a collective of fasteners, perhaps such as the single point operative solar module fasteners shown through which the rigid attachment can be completed.

By placing the solar component retainers (170) on the side of the solar panel (18) or the like, they can not only provide retention at a variety of desired structural locations, but they can also be visible for emergency personnel. Thus, side retaining each individual solar power component and sliding the solar component onto at least two side slide-in retainers can be helpful not only from the fastening perspective, but also from the emergency release perspective. The solar component axial retention character mentioned can allow sequential and even partial installation to allow the entire structure to adjust to the irregularities of the roof and the like. For emergency personnel, the solar component side column structure retainers can be especially helpful by allowing immediate view of how the panels are held in place.

As shown, these slide-in retainers may be configured as flat projections. They may project so that a simple and less obtrusive female receptor can be used on the particular component involved. They may be flat so that the minimum of intrusion exists into the component such as a solar panel (18). The solar panel (18) can be quickly installed by directing the panel support fingers (23) through the solar panel corner bracket (22). Further, by having the slide-in retainers on the solar component side column structures, they can be positioned to interact with a structural portion of a component, such as a frame or the like. As the figures show, they may also be located in the vicinity of the four corners of the solar panel (18) or the like for optimal structural integrity. By arranging all fingers in parallel and to point up the support structure, the solar component slide-in direction can be in line with gravity and make installation as easy as dropping the solar panel into place to let it slide down onto the slide-in retainers at least to some degree.

To mate with the slide-in retainers, the solar power component such as a solar panel (18) can be slotted either by having integral slots on it or by having a slot tab such as a corner slot tab (136) attached to the component. It may thus present a slotted solar power component. The panel corner bracket slot (24) is shown in the solar panel bottom lip (25). The panel corner bracket can be used for standard commercial panels that do not have slots as shown. These panel support brackets can be attached to the solar panel by screws (26) or rivets (not shown) or any conventional means and embodiments can have retrofittable slot tabs so that virtually any component can be used in some manner by a separately attachable element. Because most solar panels (18) have structurally sound frames, it can also be beneficial to engage solar panel frame slots (137) or better yet to engage solar panel integral slots for a most efficient design.

Figure 12:
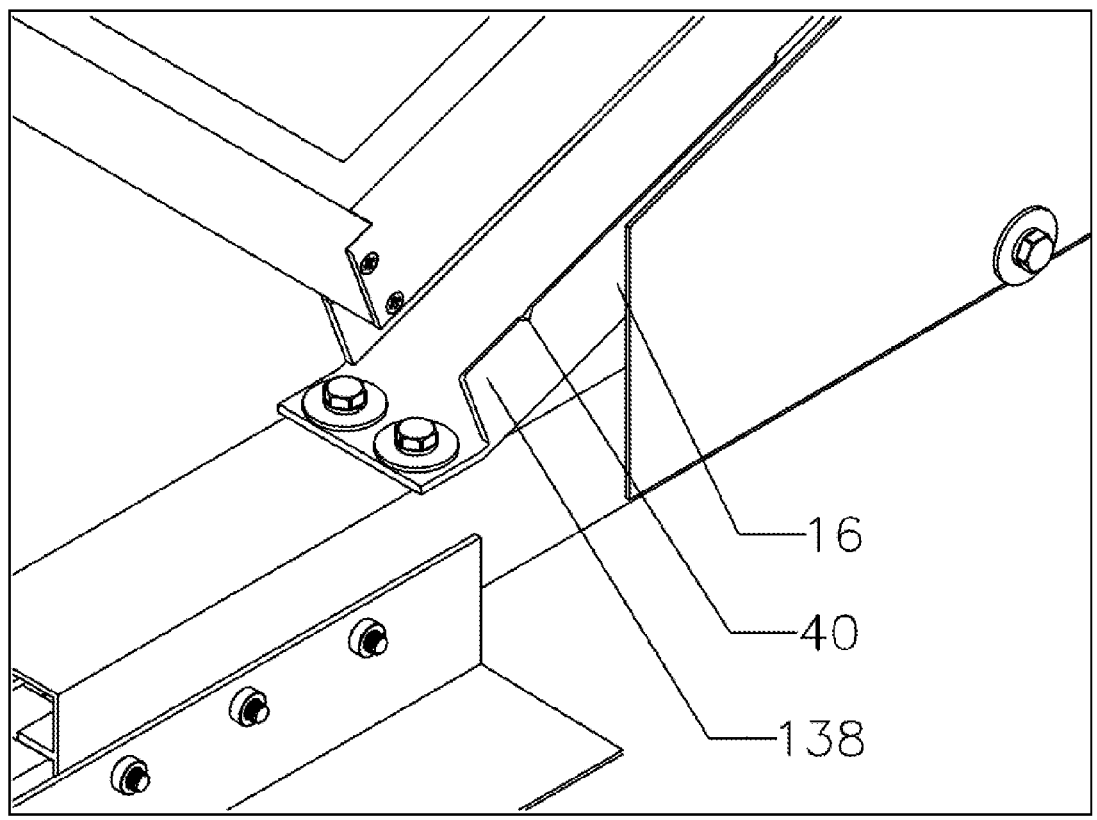
FIG. 12 is a perspective view of an alignment notch.

In some embodiments, it can be advantageous to include elements that aid in alignment prior to dropping the panel in place. As shown in FIG. 12, embodiments may include some type of at least one pre-slide alignment guide perhaps mounted on the support structure. One design may have panel support notches (40) as shown in FIG. 12 is an aid to align the panel (18) to the panel support fingers (23). The corner of the panel may be slid onto this notch, and then the panel may be rotated down on the fingers (23). Thus, frame alignment notch (138) can aid in installation. As can be appreciated, these embodiments for solar panel attachment can be very strong and can allow for very rapid solar panel installation.

FIGS. 9 and 10 show a pivot panel clamp assembly as one particular embodiment of the solar module quick-fasten assemblages (111) for holding and fastening the panel on the panel support fingers (23). The pivot panel clamp (15) is shown in the clamped position. When it is in the unclamped position the solar panel (18) can be installed on the panel support fingers (23). The panel clamp can be easily installed and uninstalled using a screw driver blade in the slot or hole (14) by prying the panel clamp up or down. For example, up to release and down to clamp. As can be understood from this particular design some fasteners and releases can be solar component pivot fasteners and solar componentry pivot or pivotable releases for user operation. Each of these pivot devices can have a pivot axis (141), such as a release operation pivot axis or a fasten operation pivot axis.

As may be appreciated, the pivot panel clamp assembly can be designed to act as a pivot wedge whereby the act of pivoting serves to wedge the solar panel component further into the panel support fingers (23) or the like. This can provide a collective of solar componentry pivotable wedge releases for various embodiments. To aid in this operation, clamps can be designed with a fulcrum arrangement so that a tool, perhaps a simple screw driver as shown in FIGS. 10A and 10B, can act as a lever to add force for more secure and forceful operation. By this feature, embodiments may provide a collective of fulcrum pivot fasteners (139) and solar componentry fulcrum releases. Such may be tool operable and may have a slot or other accommodation so that there may be included a collective of tool slotted pivot fasteners (140) or releases to attach or release the solar power component.

One of the many alternative types of clamps can be a simple slide design. One type of slide release or fastener design is a slide wedge as shown in FIG. 8. The wedge clamp (19) may be designed to be driven against the panel support assembly (16) perhaps by a screw (21). This may wedge the solar panel (18) firmly in place. As depicted, it can be understood that fastening can be achieved by operating the screw, and release can be achieved by removing the screw or by cutting the screw. Strong force in the release direction may even destructively release the wedge. Thus, embodiments can present a collective of slide wedges, a collective of slide releases, a collective of slide wedge releases (142), a collective of slide wedge fasteners, a collective of screwable slide wedge releases or fasteners, and a collective of screw-in wedges (143). As alluded to above, these may be yieldable such as by providing a relatively fragile screw so that the embodiment can present a collective of detachably yieldable wedge releases or the like. As either of the above different clamp designs illustrate, there may generally be some type of wedge fastener or wedge release, either pivotable, slidable, or otherwise.

A practical aspect that may be accomplished by some embodiments is the aspect of containedly accomplishing the installation or fastening processes through the inclusion of individualized, contained quick fasten assemblages (144). By individually, containedly quick-fasten attaching the solar component, substantially no loose elements or components are used. In this manner, the installer need not have nuts or the like (that may be dropped or left down below) to achieve fastening the individual components to the underlying support structure. The collective of contained fasteners may have substantially no loose components that are necessary to achieve fastening. This may permit a wire tie or other insubstantial loose component that is not critical to the main or perhaps initial firm fastening action. For designs that position the fastener at an elevated location, this can be particularly helpful so there is nothing to drop and roll below the emplaced panel. The contained fastener can also be configured as a quick fastener in that it can in one or two quick operations achieve its purpose of firmly attaching the component, as opposed to a long event of turning down and tightening a nut or the like. For some embodiments, in the clamped position, a spring force of the panel clamp (15) holds the solar panel (18) in place. If additional force is applied, the panel clamp is forced against the top of the panel support (16), preventing the panel clamp from releasing the solar panel (18). The panel clamp (15) may rotate around the panel clamp pin (13).

An aspect of some embodiments is the fact that they have low or no chance of breaching the existing seal of the roof as there can be a seal congruous roof solar power system. This can be accomplished by providing a collective of roof sealable base supports that suspend the support structure above the roof. Each base support can provide a solar collector base mount roof seal congruity in that it has design aspects that maintain or are particularly congruent with the integrity of the roof seal. This can be accomplished by appropriately and completely directing water away from a location at which any attachment is necessary, by proving an extensible cover membrane that extends out to overlay the base support and its immediate environment, by having an integral sandwiched or swaged seal, by presenting a semi-dome base support, or any combination of these and other actions. The collective of solar collector base mount roof seal congruities can also be sealed to the roof.

The base support roof seal congruities can be base support attached roof seal congruities. The particular element or elements selected can be literally manufactured on or into the base support so that minimal installer activity is needed to achieve and maintain the seal of the roof. As shown in FIGS. 13 through 16, in one example a cover membrane may be sandwiched in the base support. Thus, embodiments may present a collective of sandwiched membrane roof base supports (152). Mounting capabilities can also be built in. A projection fastener can be attached to the roof base support. This may be as simple as a vertical bolt attachment (148) that may be bolted, welded, or swaged to the support foot. The suspension roof base supports (147) or other such element can be assembled and designed in a variety of manners. They can be assembled without the bracket as shown in FIGS. 13 through 16. The flat plate (37) can be threaded or pushed on the penetration stud or vertical bolt attachment (148), as shown in FIGS. 13 through 16. For roof mount solar applications, sealant may be used between the flat plate (37) and the penetration stud (38), the flat plate (37), and the ply (1), and the top of the penetration base (4). The flat plate (37) is shown as round, but can be any shape.

In some embodiments, a cover membrane may be sealed to the roof. For example, the penetration ply (1) may be heat sealed to the roof ply (9). Depending on the roofing material, adhesive or tape could also be used. This could be done according to standard roofing procedures. This may very effectively seal the roof from leaking at this penetration and the pre-manufactured, pre-sealed cover membrane may further maintain the integrity of the seal. Thus embodiments may include a collective of pre-sealed roof base supports (149). The penetration ply (1) may be sealed to the roof ply (9) after the solar structure is in place. This may greatly aid in the assembly since the solar structure can be positioned before securing to the roof. Naturally, the penetration assembly may also be installed prior to the solar structure being placed. The penetration assembly can also be made without the flat plate (37). The ply (1) may be attached with sealant between the top of the penetration base (4). The ply hole (39), shown in FIG. 13A, may be smaller than the diameter of the stud to allow additional sealing capability. The penetration stud (38) may be unthreaded at the penetration (1) location. Sealant could also be forced between the penetration stud (38) and the penetration ply (1).

The penetration base may be raised in the center to allow water to flow off the center where the penetration stud (38) goes through the penetration ply (1). In addition, the feet (36) may be shaped so that water and debris flow easily over the bottom of the feet during runoff. If included, a ballast may be located above the bottom of the foot (36) to allow for this water and debris runoff flow also. As can be seen, the roof base support may be configured as a semi dome so that some part of it is raised to facilitate runoff. In this manner, embodiments may include a collective of semidome base supports (150) that have a raised area. Both penetrations and ballast on the feet are shown in the figures. No feet are shown without ballast but they can if now ballast is required.

The penetration is shown in FIGS. 13 through 16 for the system. The penetration ply normally matches the roof ply (9) but can be any material that that is acceptable in standard roofing practices. Typical ply (1) material could be TPO, EPDM, modified bitumen, asphalt composition, lead flashing, and more. Most penetrations are pre-assembled with a cover membrane that matches the roofing membrane so it can be glued, taped or heat welded to the roof membrane. Composition or tar and gravel roofing can be supplied with a lead or membrane over the penetration. This also can be made other suitable material.

Figure 13A:
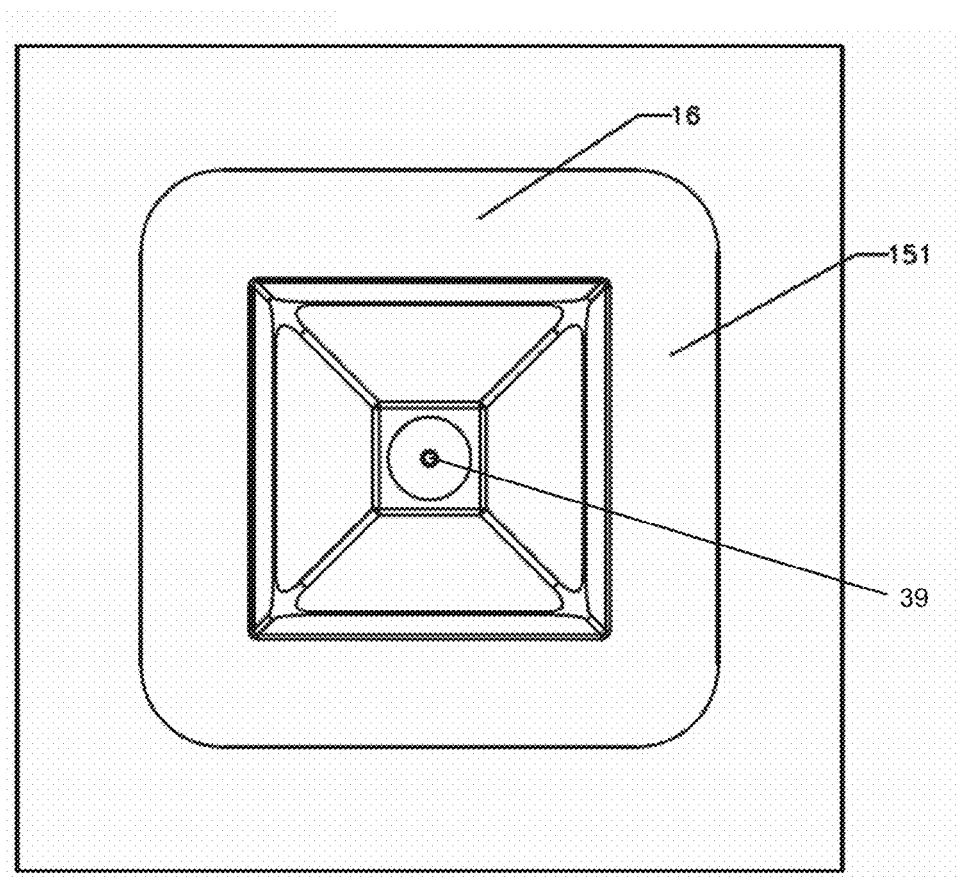
FIG. 13A is a top view of a pre-sealed base support.
Figure 13B:
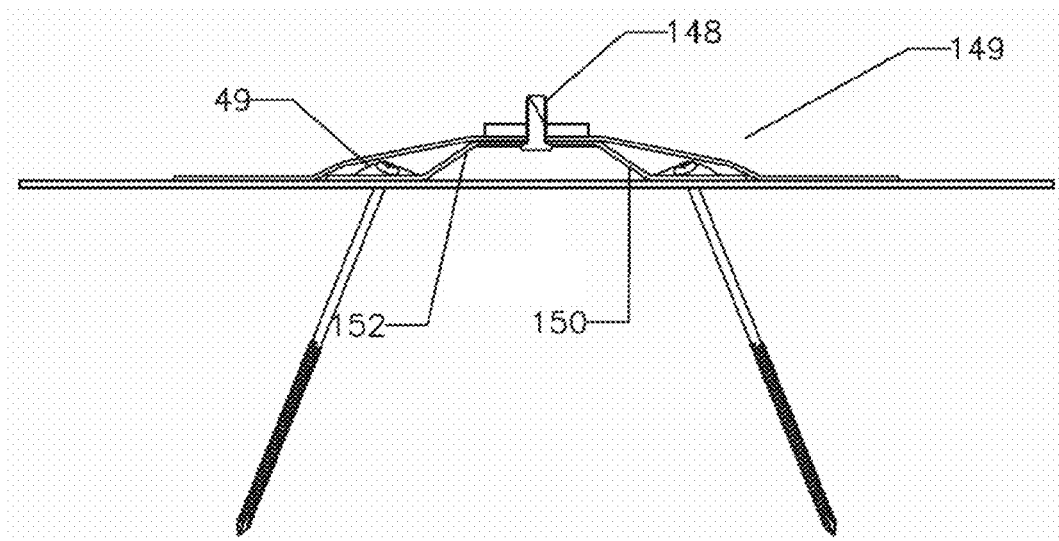
FIG. 13B is a cross section of a pre-sealed base support.
Figure 14:
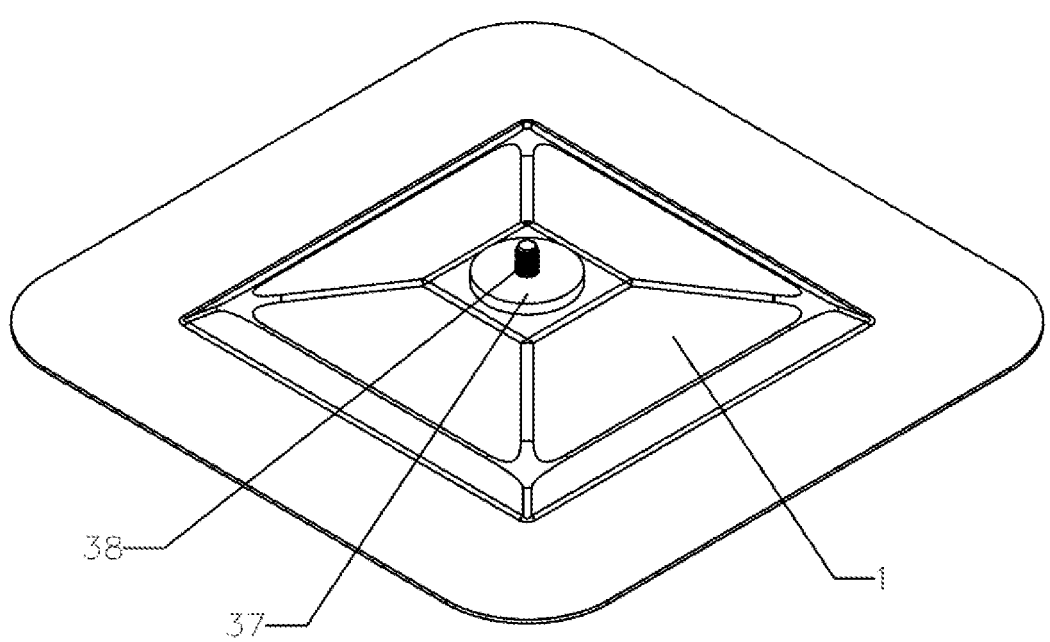
FIG. 14 is a perspective view of a pre-sealed base support.
Figure 15:
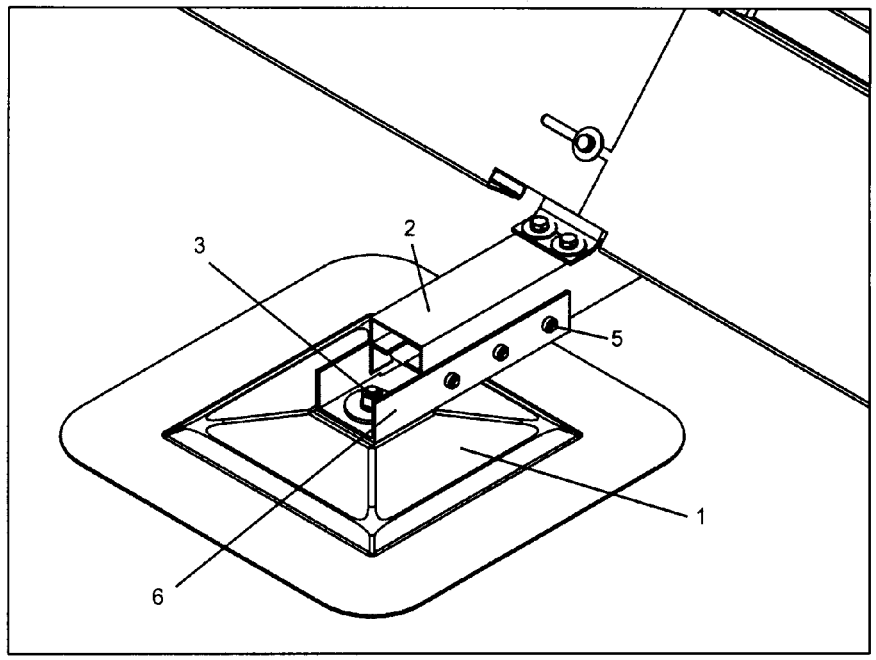
FIG. 15 is a perspective view of an end attachment to a base support.
Figure 16:
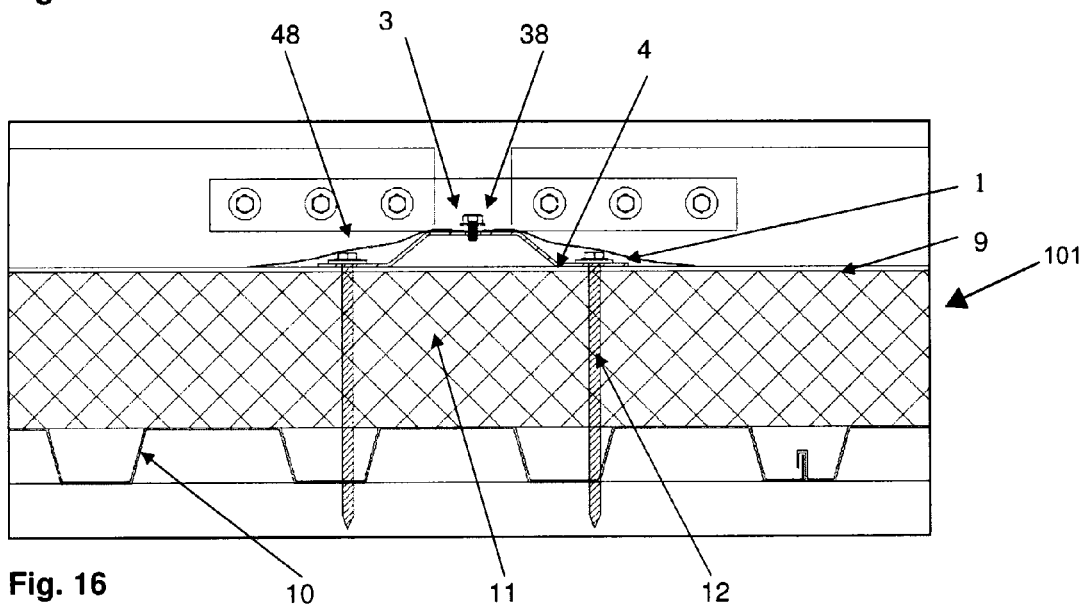
FIG. 16 is a cross section of a roof penetration.

The penetration ply (1) or cover can be molded to match the penetration base (4) as shown. This can serve to permit the ply (1) to rest against the roof in a flush arrangement, even though the base support may have a semidome shape. This presents the base support as a flushmount seal base support (151) and the entire system as presenting a collective of flushmount seal base supports. In this fashion, systems can achieve flushmount sealing each base mount roof seal congruity to the roof. Multiple holes can be put in the penetration base (4) as shown in FIGS. 13B and 16. The roofing screws (12) secure the penetration base (4) to the roof decking (10). The holes (48) may be used for attaching the screws perpendicular to the roof deck and holes (49) may be used for screws at an outward angle. Angling the screws outward can allow for higher shear forces between the penetration base and the roof deck. Importantly, in embodiments that include a roof base support roof attachment cover such as the ply (1), these intrusions can be covered and sealed so as to be in congruity with and to maintain the integrity of the roof seal and to provide a solar collector base mount roof seal congruity. FIGS. 13 through 16 show the penetration. Referring to these figures, the penetration ply (1) may be sandwiched between the roof penetration base (4) and the roof penetration bracket (6) by the tightening of nut (3) or the like. Sealant may also be put between the penetration base (4), the penetration ply (1), and the penetration bracket (6) to assure no leakage through or around the penetration base stud. For additional strength, the penetration assembly or base support can be larger. In addition, the number and size of the roof screws (12), the number and size of the penetration stud (37), and the size and thickness of the penetration base (4), can all be changed depending on the strength required.

In order to provide high quality sealing, the cover membrane such as the penetration ply (1) can extend significantly beyond the base support foot so that sealing can occur at a distance from the actual penetrations. In this manner, embodiments can provide a collective of extensive seal base supports (153) that extensively seal each base mount roof seal congruity to the roof. High quality sealing can also be provided by swaging the stud or a vertical bolt attachment (148) to the foot among other aspects. The stud can be swaged in the penetration base or the foot to further prevent water getting through the penetration base (4).

As those involved in solar systems for roof mounting well understand, roofs are often irregular. Embodiments can accommodate this reality by providing for an initial assembly that is pliant and can conform to such irregularities and then can be made rigid to firmly fix all individual solar components in place. Such may include a column as well as row irregularity pliant solar support structure connection system. This can be achieved by providing movable or adjustable joints between the support structure members where slight or larger variations can be permitted. By establishing an adjustment movable suspended solar component position lattice and by achieving the steps of fine positioning at least some aspects of the system and perhaps also intermediately row irregularity pliantly connecting the support structure, embodiments can provide an adjustment movable suspended solar component position lattice.

Adjustment can exist in a vertical direction such as with vertical slots in the support structure members. It can also in a horizontal direction such as with horizontal slots in the support structure members. Similarly, it can exist for a column such as with column member slots in the support structure members. It can also for a row such as with row slots in the row support structure members. In these manners embodiments can present a vertically pliant solar support structure connection system such as with a vertically slotted position lattice (155). In more general terms it may establish a slotted assembly position lattice perhaps such as a vertically slotted assembly position lattice. With these designs, installation can involve intermediately row irregularity pliantly connecting the solar power system row support structure members and intermediately vertically pliantly connecting the solar power system column support structure members. The slotted support structure members are one way of providing an intermediary pliant solar support structure connection system and a plaint suspended solar component position lattice. Others also exist. Further, the steps of establishing an intermediary pliant solar support structure connection system and intermediately pliantly connecting at least some of the members can occur at the same time or practically simultaneously as the step of making the system rigid.

After the support structure is assembled, either before or after the individual solar components are initially attached or before or after the individual solar components are rigidly attached, the support structure can be made rigid and rigidly held in place. This can be accomplished by a collective of rigid fixation solar support structure anchor retainers to establish a rigid suspended solar component position lattice (159). This may be held substantially rigid by the rigid fixation solar support structure anchor retainers which may firmly fix one support member to another. This can effectively makes the system stiff in the column and perhaps row direction to clamp-down the support structure.

Figure 17:
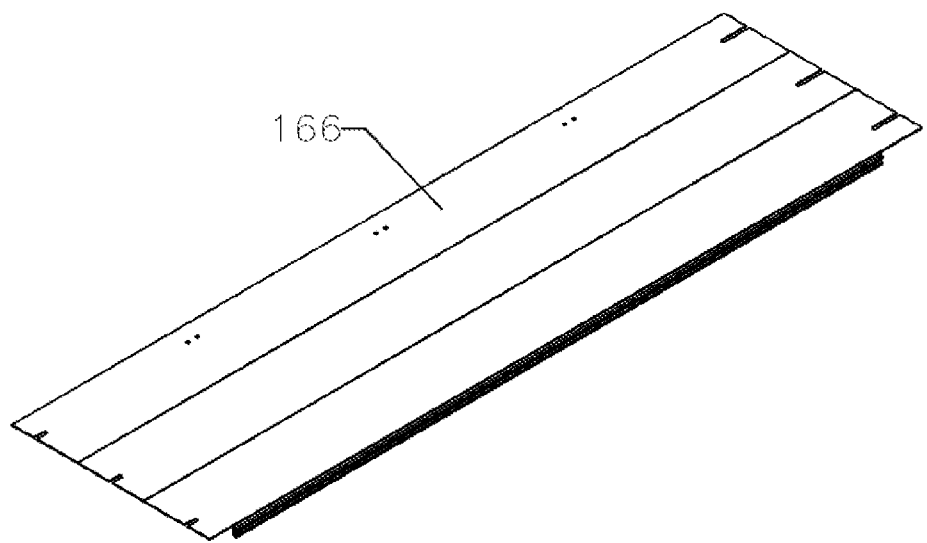
FIG. 17 is a perspective view of a full wind deflector.
Figure 18:
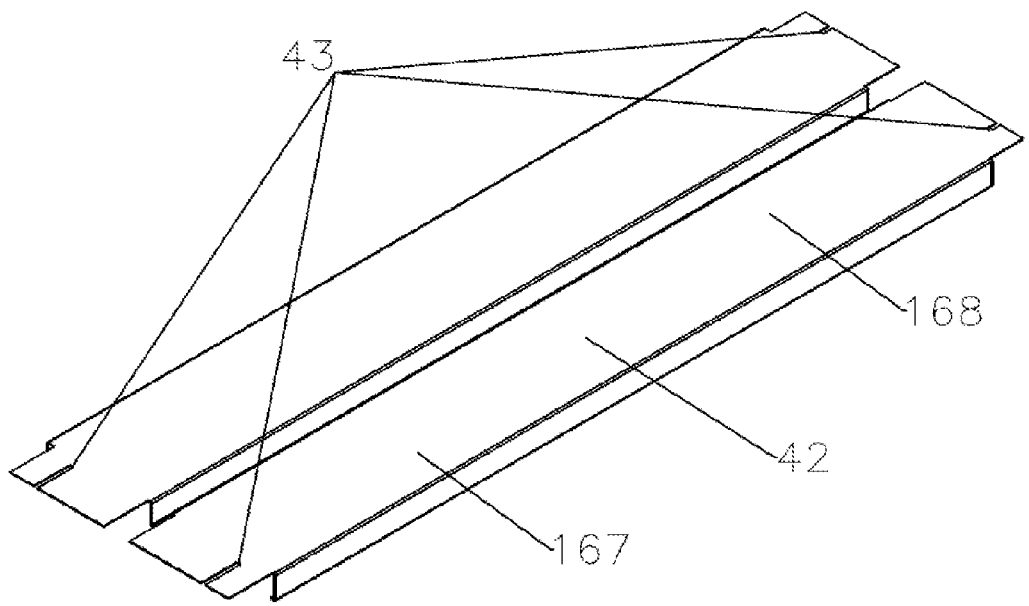
FIG. 18 is a perspective view of a slotted short wind deflector.
Figure 19A:
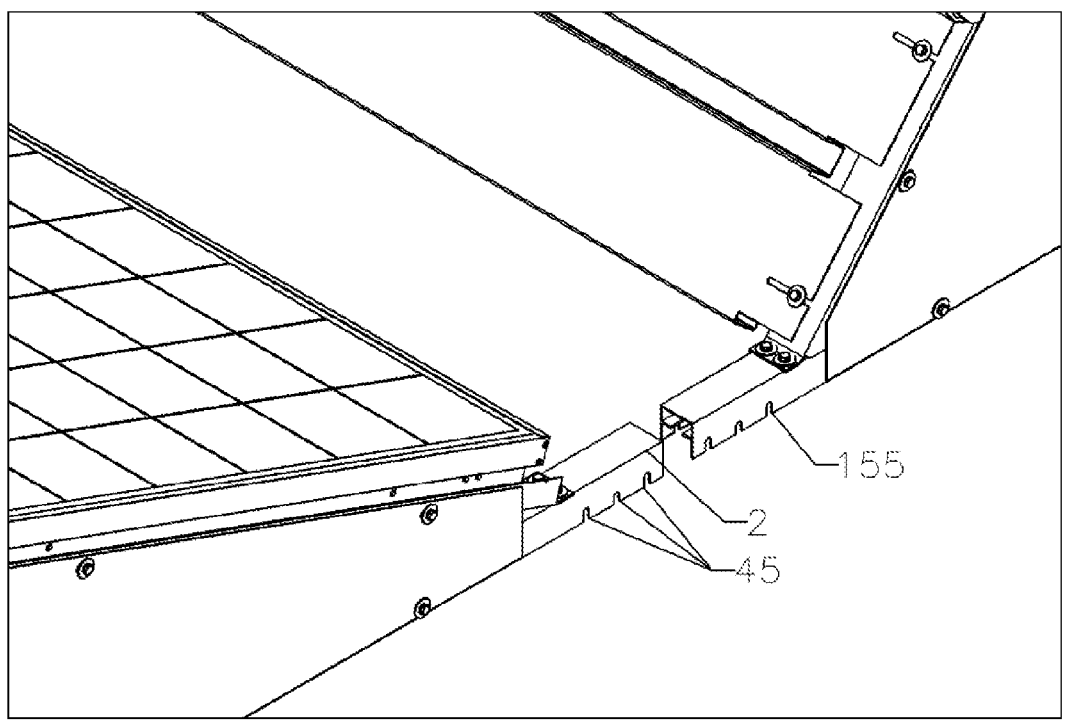
FIGS. 19A and 19B are perspective views of slotted column channels.
Figure 19B:
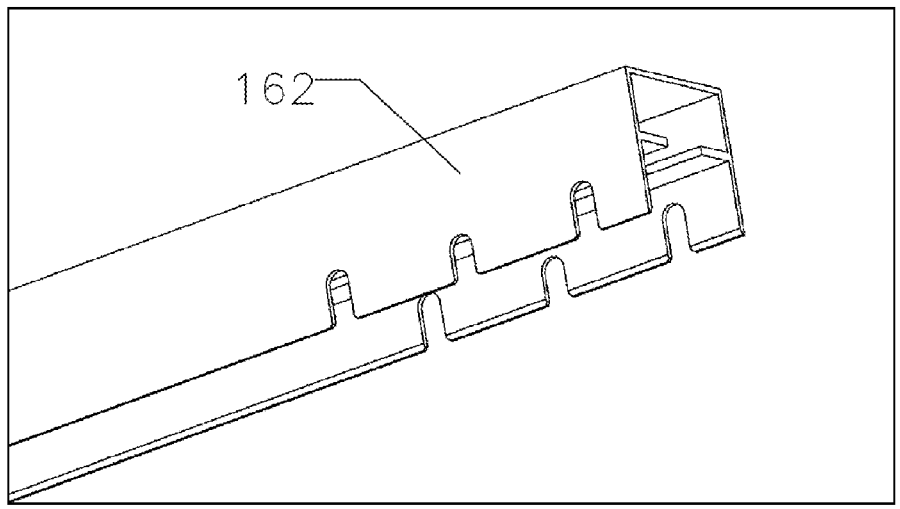
Figure 20A:
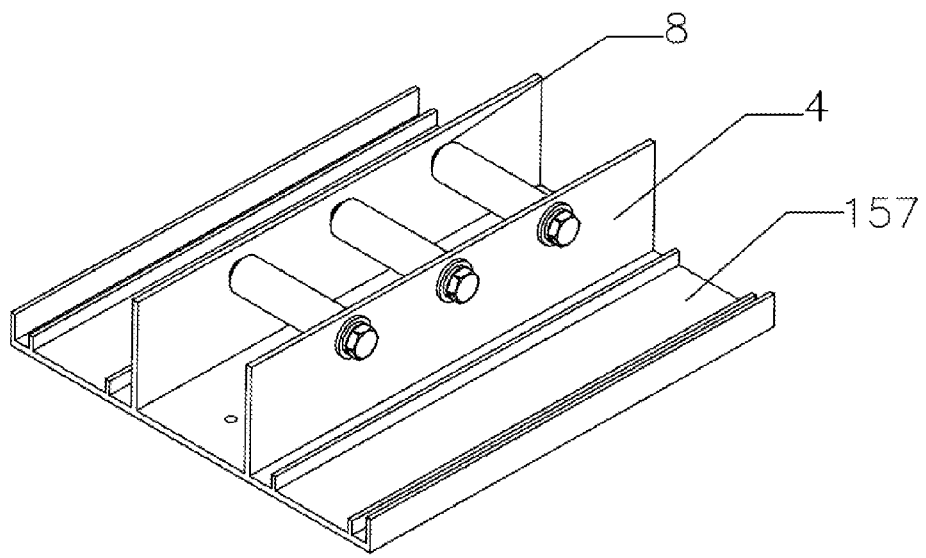
FIG. 20A is a perspective view of a short foot or end support structure member juncture assembly.
Figure 20B:
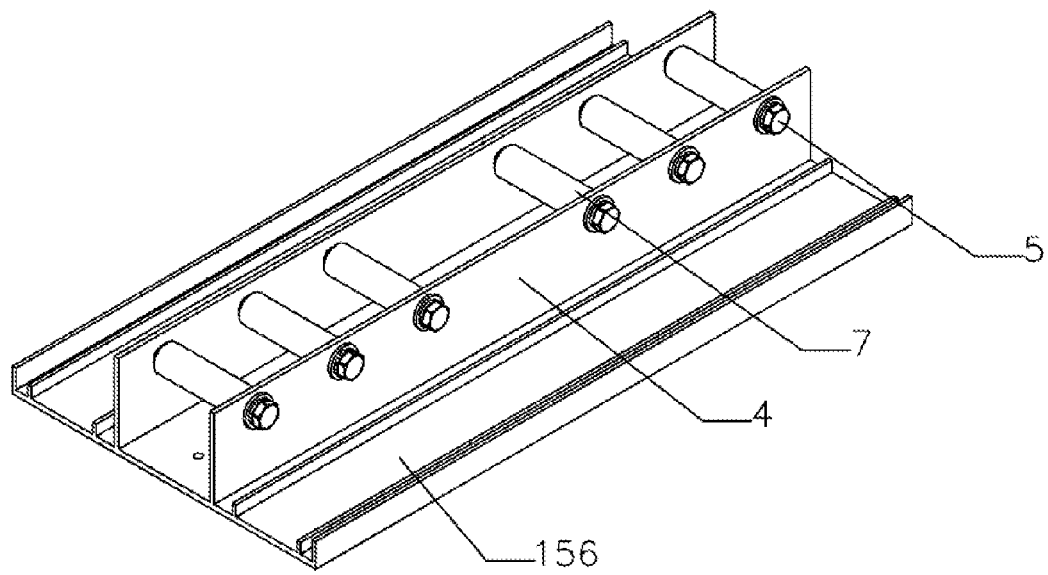
FIG. 20B is a perspective view of a long foot assembly short foot or intercolumnal support structure member juncture.
Figure 22:
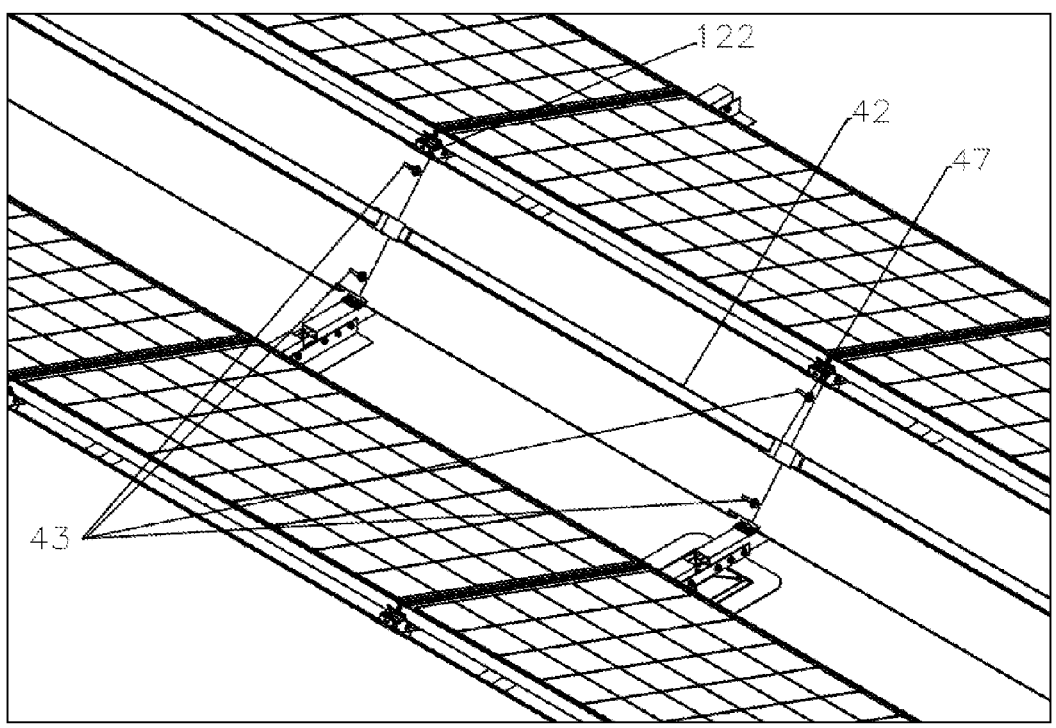
FIG. 22 is a perspective view of an attached slotted wind deflector.

The slots (43) shown in the rear wind deflector (42) in FIGS. 17, 18, and 22 may allow for rows to adjust over peaks or valleys in flat roofs. This also applies to the slots shown in any rear brace. The panel spacing (46) may allow for a larger adjustment over roof valleys. The slots (45) shown in panel support bottom channel (2) in FIGS. 5 and 19 may also be used to allow the structure to adjust over peaks and valleys in flat roofs. These slots may allow the solar structure to conform to the roof during bolting of the feet (36), the penetration bracket (6), the rear wind deflector (42), and the rear brace shown as in FIGS. 17, 18, and 22. Once bolted, the solar structure may be a strong single structure.

Figure 23:
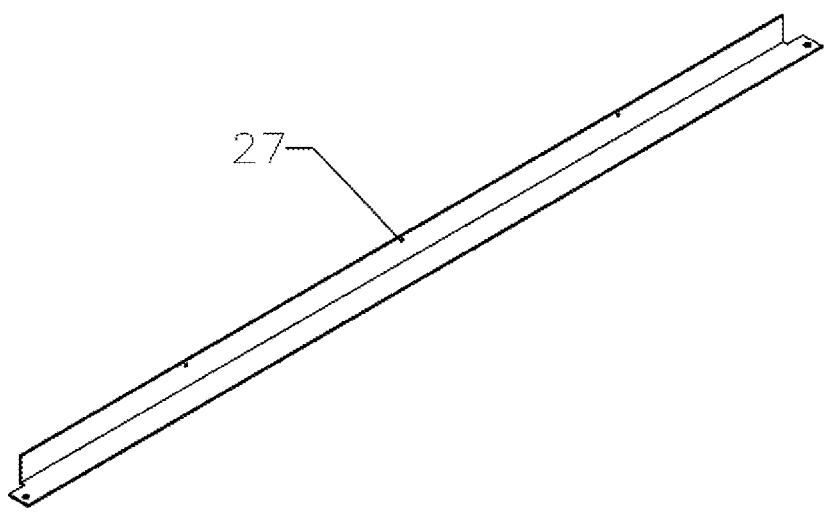
FIG. 23 is a perspective view of a front panel support.

For very high wind applications, additional solar panel support may be required. FIG. 23 shows a front panel support (27). The front panel support (27) is attached to the top of the panel support assembly (28) with bolt (29). The solar panel (18) or other component may be secured to the front panel support (27) by self tapping screws or otherwise. With these screws and appropriate lock washers, there can also be a good ground connection to the solar panel if the solar panel structure is grounded properly.

In order to connect different columns, row support members can be included. Such a row member can be a suspended solar power component retainer front support member that also serves to support the solar component such as the solar panel (18) during installation and afterwards. Simple construction is possible with angled row interconnect frame supports that may be inexpensive right angle material. By connecting a plurality of angled row interconnect frame supports, the entire solar power componentry support structure (104) may be interconnected row to row and may be more self supporting. These may be suspended off the roof or other surface.

Intercolumn connection can also be made such as shown in FIGS. 3, 15, 20, and 25 with the short and long foot assemblies. These feet may be secured to a column member perhaps such as the panel support bottom channel (2) in the same manner as the penetration bracket (6). More generally, these feet can be end support structure member junctures (157) and intercolumnal support structure member junctures (156). The intercolumnal support structure member junctures (156) can be merely extended end support structure member junctures for efficiency and installation flexibility. Altogether, the various interconnects and members can establish an interconnected solar component position lattice.

The penetration bracket (6) may be secured to the panel support bottom channel by tightening the bolts (5) against the penetration bracket (6), the panel support bottom channel (2), and the spacers (7). Slots (8) may be included for the penetration bracket (6) to help with compressing the penetration bracket (6). As shown, the channels can provide base support access exposed support structure member junctures (160) that permit direct access to locations at which the base supports may be attached.

Figure 24A:
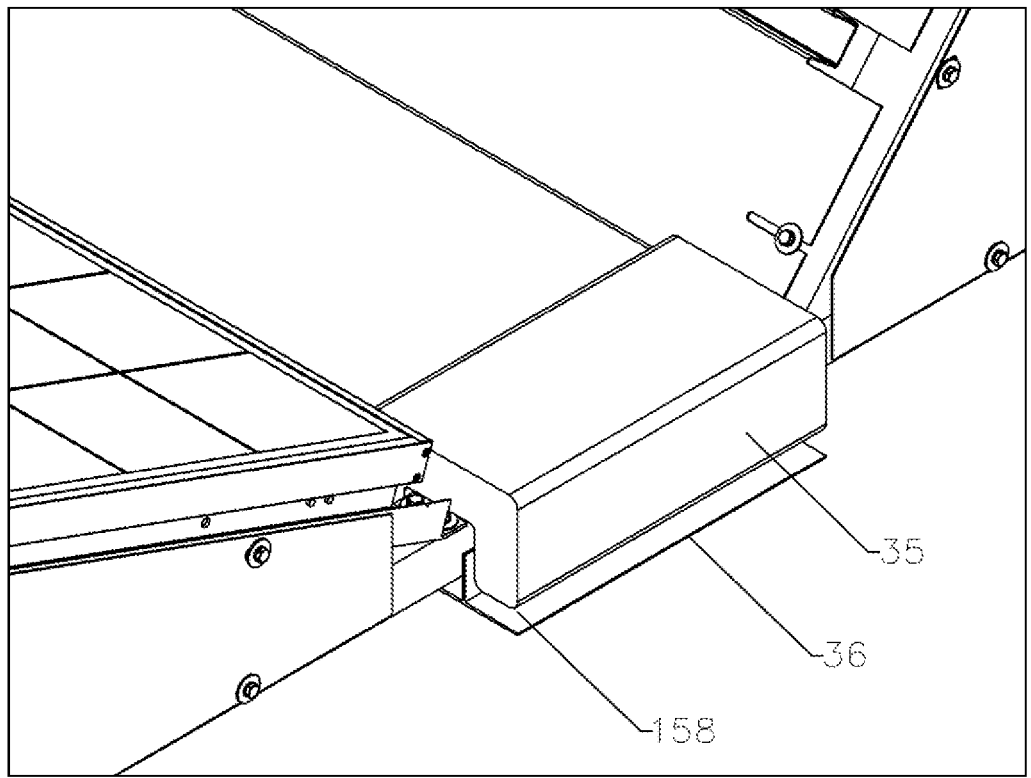
FIGS. 24A and 24B are perspective views of a ballasted system.
Figure 24B:
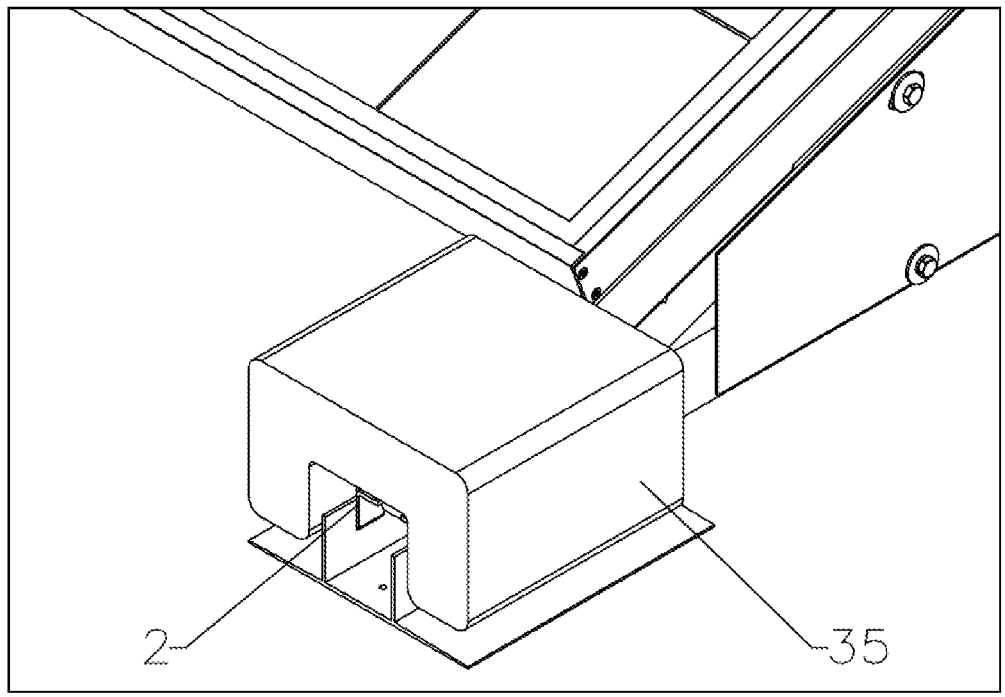
Figure 25:
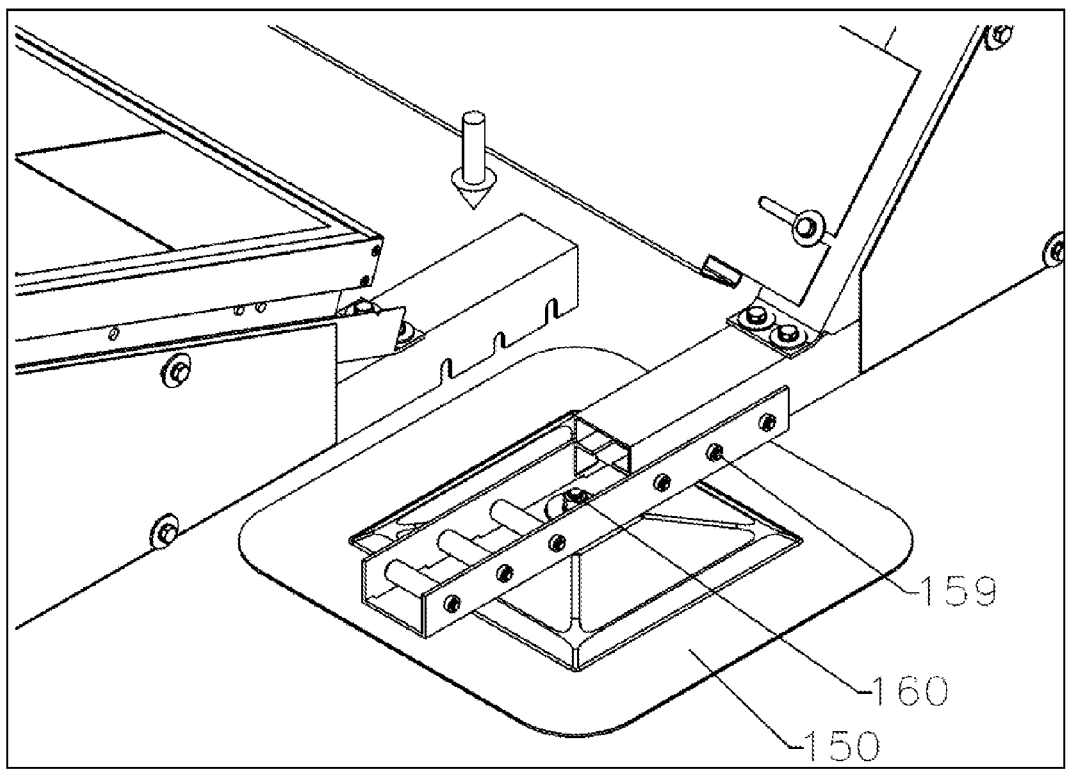
FIG. 25 is a perspective view of an intercolumnal support structure member juncture.

In some installations it may not be necessary to actually penetrate the roof to lock down the support structure. It may be possible for embodiments to use ballast to hold it down. For such embodiments, there may be included a plurality of solar collector ballast platform base supports (158) so that the ballast need not impact the roof seal and so that it can maximize its holding forces. FIG. 24 shows a ballasted system. The ballast (35) may be shaped so that it rests on top and extends over the sides of the panel support bottom channel (2). It may also be inside or at other locations on the support lattice. The ballast (35) can be on some of the feet (36) as required to hold down the system from external loads such as wind. The system can have a combination of feet with or without ballast and penetrations. The ballast shown can also be standard size concrete shape and rest on a support shaped like a saddle (not shown) over the panel support bottom channel (2). These solar ballast base locations can be on the end and intercolumnal support structure member junctures. They may also be provided on solar collector ballast platform base supports (which may also be such junctures).

Figure 21:
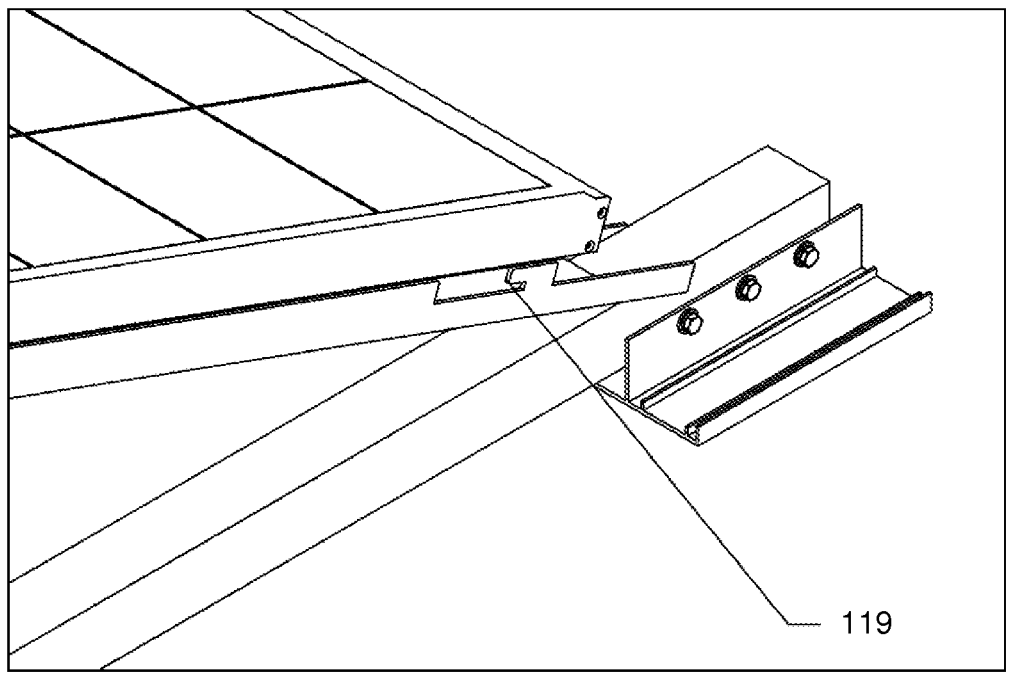
FIG. 21 is a perspective view of a short foot or end support structure member juncture attached to a column support.

A particularly efficient to manufacture embodiment includes the column members as constructed from channel stock as shown. This can involve using interconnected inverted channel support structure members having slots (162) and interconnected upright channel support structure members having slide-in retainers (163) and in general solar component side column channels. For the interconnected upright channel support structure members having slide-in retainers (163) it can also be very efficient to include flanking projection retainers (161) with respect to a projection retainer for an adjacent solar component such as the two slide-in retainers manufactured adjacently in one upright channel as shown in FIGS. 4, 5, and 21. Thus, embodiments can provide dual finger column structure retainers (164). They can also include slotted channels. Further, the slide-in retainers can be bolted on or they can be side column channel integral retainers.

The structure may be designed so the wind is directed over and around the solar panels support system components to minimize the lift of the structure off the roof. To further minimize lift and drag, wind may be allowed to flow under the solar panels and solar panel support system. Also the structure may be designed so that the solar panel rows shield each other from the wind so the full force of the wind is not felt on each solar panel or structure. Where required, wind deflectors can also be added to aid in this process. There may also be panel brackets which tie the solar panel (18) to the wind deflector or if required, to the rear brace. For extreme wind velocity, full wind deflectors with brackets can be used on all rows. The deflector brackets may be held to the deflectors (or braces) with self tapping screws in the side of the solar panel (18). Note that in some areas the braces (34) are not shown. These deflector brackets can make the structure very strong in the row direction.

Two different wind deflectors can be used in some embodiments. A collective of full length exterior component wind deflectors (166) can be used such as at an exterior end or the like where wind forces may be the greatest. A collective of shortened interior component wind deflectors (167) may be used such as at interior locations or the like where wind forces may be reduced. To facilitate the installation and emergency release functions mentioned earlier, the wind deflectors may be both suspended panel detached wind deflectors and panel detached wind deflectors. As mentioned above for the plaint support system, a plurality of slotted row interconnect wind deflectors (168) may be included. These wind deflectors can also serve as row interconnects and so embodiments may include a plurality of row interconnect wind deflectors.

As mentioned before, embodiments of this type of system can be very easy to install. One possible installation sequence summary is shown in the following steps. Refer to the figures and other areas in this application for some details. Steps may include:

Placing the short foot assemblies, the long foot assemblies and penetration assemblies (if required) on the roof.

Slipping the left side panel support assemblies, the middle panel support assemblies, and the right side panel support assemblies on the penetration brackets and feet. Note that side panels may not be required in certain lower wind or building configurations.

For high wind applications, attaching the front panel support. Installing the solar panel, and securing with the panel clamp.

Straightening up the feet and penetrations and aligning the system.

Installing the full wind deflectors if (required) and rear braces. Note that in many lower wind areas, full wind deflectors may not be required.

Tightening all foot, penetration, deflector and rear brace screws.

If penetrations were used, securing the penetration base using the roofing screws. Sealing the penetration ply to the roofing ply.

If ballast is required, placing the ballast on the feet in the areas where needed. Ballast can be placed on either side or both sides of the feet.

This solar panel support system is very easy and fast to assemble. A summary of some of the fast install and other features include:

Almost all hardware can be attached to the part assemblies. Mating parts may be slotted so they can slip on the bolts.

Fast solar panel installation with quick panel clamping may be achieved.

Fast penetration as described earlier. Robust roof sealing.

Most installations can be non-penetrating with the use of ballast. Ballast can be placed where needed.

No wind deflectors or side deflectors may be needed in most areas.

The solar panel structure can be made at different angles.

A rigid system may be provided in both column and row directions. High local loads can be distributed over large areas.

Easy ballast placement may be achieved.

Quick panel removal for fire needs or the like can be included.

For the penetrations, the roof understructure can be metal, wood or other type of material that screws can penetrate and hold. Additional holes in a penetration base can also be added for additional strength by using more screws for attachment. The penetration assembly can also be used for other solar applications such as attaching channel, beams, angle or any other structural member for solar structures. It can also be used for attaching conduit, combiner boxes, re-combiner boxes, junction boxes, electrical conduit and other solar structures. The penetration assembly may have special brackets or may be used without an attached bracket as described. The penetration base (4) may be secured to the roof with self drilling roofing screws (12) or the like. These screws normally would go through the roof ply (9), the roof insulation (11), and screw down to the metal roof decking (10). Screws could also be secured in roofing plywood or other suitable material.

All components members and elements can also be adapted for use in non-solar applications. For example, the solar component supports can be adapted to serve as supports for other devices. Importantly, this disclosure should be understood as presenting both the solar devices mentioned as well as each device made and described in a non-solar mode of use and adaptation and by non-solar limiting language. It can be used for attaching any structure to a roof or any other surface. All the features for the solar penetration may apply to the non-solar applications. The penetration bracket (6) is typically preassembled as shown in FIG. 13B. For non-solar applications, a different bracket for the application can also be installed. Typical non-solar structures could be wind screens, screens to hide roof equipment, roof equipment, electrical conduit, electrical boxes, or any other structures mounted to roofs. Possible features for the penetration may include but not be limited to:

This type of penetration is highly water tight.

The center of the penetration is raised to prevent water pooling and leaking.

The penetration stud is raised above the roof and sealed with penetration ply.

The ply may be sandwiched between the penetration bracket and penetration base to further prevent water penetration to the roof. Sealant may be placed between the penetration ply and penetration base to further prevent leakage.

The penetration ply may be sealed to the roof with standard roofing practices as recommended by the roofing manufactures. This penetration may be easily approved by the roofing manufactures and should not void the roofing warranty.

The penetration can be attached to the roof after structure attachment which makes for easier installation.

The structure of the penetration and mounting may be very strong and may allow for good shear strength between the structure and the roof.

The penetration base may be large which may reduce the surface load on the roof.

The features on the penetration bracket may allow for angling the roofing screws.

The penetration assembly may be very versatile.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention.

Other embodiments may include:

An emergency personnel accommodative solar power system comprising:
  a solar power componentry support structure;
  a matrix of individual solar power components mounted on said solar power componentry support structure; and
  a collective of solar componentry emergency releases for said individual solar power components configured to facilitate emergency release of at least some of said individual solar power components from said solar power componentry support structure upon emergency personnel need.

A modularized solar power system comprising:
  a plurality of solar collector suspension base supports;
  a suspended substantially rigid solar component position lattice supported by said plurality of solar collector suspension base supports;
  a matrix of individual solar power components mounted on said suspended substantially rigid solar component position lattice; and
  a collective of individualized, contained solar module quick-fasten assemblages through which said individual solar power components are fixedly emplaced with respect to said suspended substantially rigid solar component position lattice.

A seal congruous roof solar power system comprising:
  a matrix of individual solar power components;
  a solar power component support roof lattice to which said matrix of individual solar power components are mounted;
  a plurality of suspension roof base supports under said solar power component support roof lattice; and
  a collective of solar collector base mount roof seal congruities, each mounted relative to said suspension solar collector roof base supports.

A solar collector mount system comprising:
a solar power componentry support structure having at least one solar component emplacement location;
a first solar component slide-in retainer mounted relative to said solar power componentry support structure, positioned at a first solar component emplacement edge, and having a first solar component slide-in direction along a solar component initial insertion axis;
a second solar component slide-in retainer mounted relative to said solar power componentry support structure, positioned separate from said first solar component slide-in retainer along said first solar component emplacement edge, and also having a second solar component slide-in direction that is parallel to said first solar component slide-in direction along said solar component initial insertion axis; and
an opposite edge solar component placement fastener mounted relative to said solar power componentry support structure, positioned at an opposite solar component emplacement edge as compared to said first solar component emplacement edge, and having at least a solar component axial retention character along said solar component initial insertion axis.

An adaptive installation solar power system comprising:
a plurality of solar collector suspension base supports;
a collective of suspended solar power system column support structure members;
a collective of suspended solar power system row support structure members;
an intermediary pliant solar support structure connection system to establish a plaint suspended solar component position lattice; and
a collective of rigid fixation solar support structure anchor retainers to which said solar power system support structure members are responsive to establish a rigid suspended solar component position lattice.

A method of providing an emergency personnel accommodative solar power system comprising the steps of:
establishing a solar power componentry support structure;
connecting a matrix of individual solar power components mounted on said solar power componentry support structure;
providing a collective of solar componentry emergency releases for said individual solar power components configured to facilitate emergency release of at least some of said individual solar power components from said solar power componentry support structure upon emergency personnel need; and
facilitating immediate emergency release of said individual solar power components from said solar power componentry support structure by emergency personnel.

A method of installing a modularized solar power system comprising the steps of:
establishing a plurality of solar collector suspension base supports for a pre-existing surface;
connecting solar power system support structure members to establish a suspended solar component position lattice supported by said plurality of suspension base supports;
providing a collective of individualized, contained solar module quick-fasten assemblages on said suspended solar component position lattice;
positioning individual solar power components at individual solar matrix locations on said suspended solar component position lattice; and
individually, containedly quick-fasten attaching said individual solar power components at their respective individual solar matrix locations on said suspended solar component position lattice through use of said individualized, contained solar module quick-fasten assemblages to accomplish fixedly emplacing each of said individual solar power components on said suspended solar component position lattice.

A method of installing a modularized solar power system comprising the steps of:
establishing a matrix of individual solar power components on a roof;
fixedly supporting said matrix of individual solar power components by a solar power componentry support roof lattice;
suspending said solar power componentry support roof lattice by a plurality of solar collector suspension roof base supports under said solar power component support roof lattice; and
establishing a collective of solar collector base mount roof seal congruities relative to said solar collector suspension roof base supports.

As can be easily understood from the foregoing, the basic concepts of the present invention may be embodied in a variety of ways. It involves both solar power techniques as well as devices to accomplish the appropriate installation of a solar power system. In this application, the solar power techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "retainer" should be understood to encompass disclosure of the act of "retaining"—whether explicitly discussed or not—and, conversely, were there effectively disclosure of the act of "retaining", such a disclosure should be understood to encompass disclosure of a "retainer" and even a "means for retaining." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the solar devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A seal congruous roof system comprising:
   a first roof structure positioned above a second roof structure;
   at least one roof base support positioned under said first roof structure;
   at least one base mount roof seal congruity mounted relative to a respective said roof base support; and
   wherein said base mount roof seal congruity further comprises a cover membrane mounted to seal penetrations in both said roof base support and said second roof structure.

2. The seal congruous roof system as described in claim 1 wherein said cover membrane comprises a formed cover membrane mounted relative to said roof base support.

3. The seal congruous roof system as described in claim 1 wherein said base mount roof seal congruity further comprises a semi-dome base mount roof seal congruity.

4. The seal congruous roof system as described in claim 1 wherein said collective of base mount roof seal congruities further comprises a collective of flat roof base supports.

5. The seal congruous roof system as described in claim 1 wherein said base mount roof seal congruity is mounted relative to the respective said roof base support with at least one attached base-mount fastener.

6. The seal congruous roof system as described in claim 1 further comprising at least one projection fastener configured to attach the respective said roof base support to said second roof structure.

7. The seal congruous roof system as described in claim 1 wherein said base mount roof seal congruity further comprises a flushmount seal base support.

8. The seal congruous roof system as described in claim 1 wherein said base mount roof seal congruity further comprises an extensive seal base congruity.

9. The seal congruous roof system as described in claim 1 wherein said base mount roof seal congruity comprises a collective of pre-sealed base mount roof seal congruity.

10. The seal congruous roof system as described in claim 9 wherein said pre-sealed base mount roof seal congruity comprises a sandwiched membrane roof base support.

11. A seal congruous roof system comprising:
    a first roof structure positioned above a second roof structure;
    at least one raised roof base support positioned under said first roof structure;
    at least one domed base mount roof seal congruity mounted relative to a respective said raised roof base support;
    wherein said domed base mount roof seal congruity individually seals the respective raised roof base support; and
    wherein said domed base mount roof seal congruity comprises an outer edge sealingly contacting said second roof structure.

12. The seal congruous roof system as described in claim 11 wherein said at least one domed base mount roof seal congruity comprises a semi-dome base mount roof seal congruity.

13. The seal congruous roof system as described in claim 11 wherein said at least one domed base mount roof seal congruity comprises a domed flushmount seal base congruity.

14. The seal congruous roof system as described in claim 11 wherein said domed base mount roof seal congruity combined with said raised roof base support comprises a sealed stud roof base support.

15. The seal congruous roof system as described in claim 11 wherein said domed base mount roof seal congruity combined with said raised roof base support comprises a pre-sealed domed roof base support.

16. The seal congruous roof system as described in claim 11 wherein said raised roof base support comprises a center raised penetration base.

17. The seal congruous roof system as described in claim 11 wherein said at least one domed base mount roof seal congruity comprises a domed cover membrane.

18. The seal congruous roof system as described in claim 17 further comprising a sealant positioned between said domed cover membrane and said second roof structure.

19. A congruous roof system comprising:
    a first roof structure positioned above a second roof structure;
    at least one roof base support positioned under said first roof structure;
    at least one formed, high shear force penetration base securing said roof base support to said second roof structure with at least one angled projection fastener;
    wherein said formed, high shear force penetration base is mounted relative to said roof base support; and
    wherein said at least one angled projection fastener penetrates said second roof structure.

20. The congruous roof system as described in claim 19 wherein said at least one angled projection fastener comprises at least one outwardly angled projection fastener.

21. The congruous roof system as described in claim 19 wherein said formed, high shear force penetration base comprises at least one formed roof attachment hole.

22. The congruous roof system as described in claim 19 wherein said at least one angled projection fastener further comprises two outwardly angled projection fasteners.

23. The congruous roof system as described in claim 22 wherein said at least two outwardly angled projection fasteners comprises at least two oppositely located outwardly angled projection fasteners.

24. The congruous roof system as described in claim 19 further comprising a at least one base support attached roof seal congruity.

25. The congruous roof system as described in claim 24 wherein said at least one base support attached roof seal congruity comprises a roof sealable formed, high shear force penetration base.

26. The congruous roof system as described in claim 24 wherein said at least one base support attached roof seal congruity comprises an extensive seal formed, high shear force penetration base.

27. The congruous roof system as described in claim 24 wherein said at least one base support attached roof seal congruity comprises a pre-sealed formed, high shear force penetration base.

* * * * *